United States Patent
Mochizuki et al.

(10) Patent No.: US 8,605,957 B2
(45) Date of Patent: Dec. 10, 2013

(54) FACE CLUSTERING DEVICE, FACE CLUSTERING METHOD, AND PROGRAM

(75) Inventors: Shunsuke Mochizuki, Tokyo (JP); Makoto Murata, Tokyo (JP); Yun Sun, Tokyo (JP); Tomohiko Gotoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 336 days.

(21) Appl. No.: 13/038,745

(22) Filed: Mar. 2, 2011

(65) Prior Publication Data

US 2011/0249904 A1   Oct. 13, 2011

(30) Foreign Application Priority Data

Apr. 9, 2010 (JP) ................. 2010-090290

(51) Int. Cl.
*G06K 9/00* (2006.01)
(52) U.S. Cl.
USPC ........... 382/118; 382/115; 382/116; 382/117; 382/165; 382/225; 382/224; 382/168; 382/169; 382/170; 382/171
(58) Field of Classification Search
CPC .......... G06K 9/00221; G06K 9/00281; G06K 9/00288
USPC ......... 382/118, 115, 116, 117, 165, 225, 224, 382/168, 169, 170, 171
See application file for complete search history.

(56) References Cited

U.S. PATENT DOCUMENTS

2009/0041312 A1* 2/2009 Wakasugi ............... 382/118
2009/0316962 A1* 12/2009 Sun et al. ............... 382/118

FOREIGN PATENT DOCUMENTS

| JP | 2009-81883 | 4/2009 |
| JP | 2010-3021 | 1/2010 |

OTHER PUBLICATIONS

Gallagher (A Framework for Using Context to Understand Images of People).*
U.S. Appl. No. 12/908,273, filed Oct. 20, 2010, Gotoh, et al.

* cited by examiner

*Primary Examiner* — Mike Rahmjoo
(74) *Attorney, Agent, or Firm* — Oblon, Spivak, McClelland, Maier & Neustadt, L.L.P.

(57) ABSTRACT

Provided is a face clustering device that detects a face included in an image, detects a direction of the detected face, detects, taking into account the detected direction of the face, a face with a similar feature and forms a collection of pieces of face information showing a feature of this face, narrows down, for each collection of pieces of face information which has been formed, the number of pieces of face information to a number set in advance for each face direction and sets each collection of pieces of face information for which the number has been narrowed down as a unit group, and performs, with the set unit group as a unit, clustering based on pieces of face information included in each unit group.

9 Claims, 24 Drawing Sheets

FIG.13
STEP 1: CLASSIFICATION BASED ON FACE DIRECTION
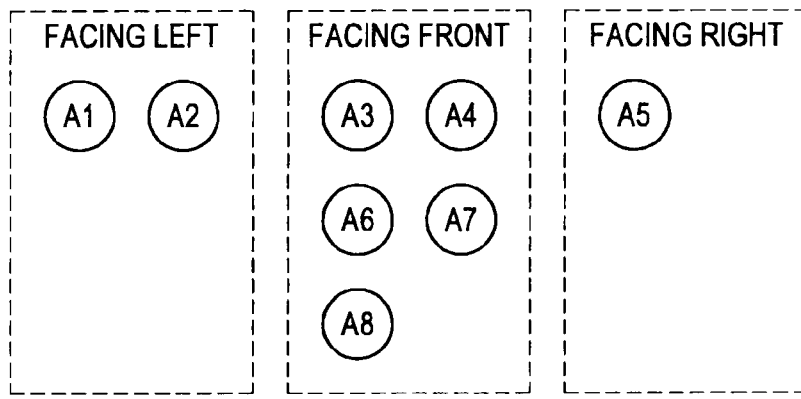
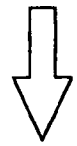
STEP 2: ASSIGNMENT TO FEATURE QUANTITY SLOT
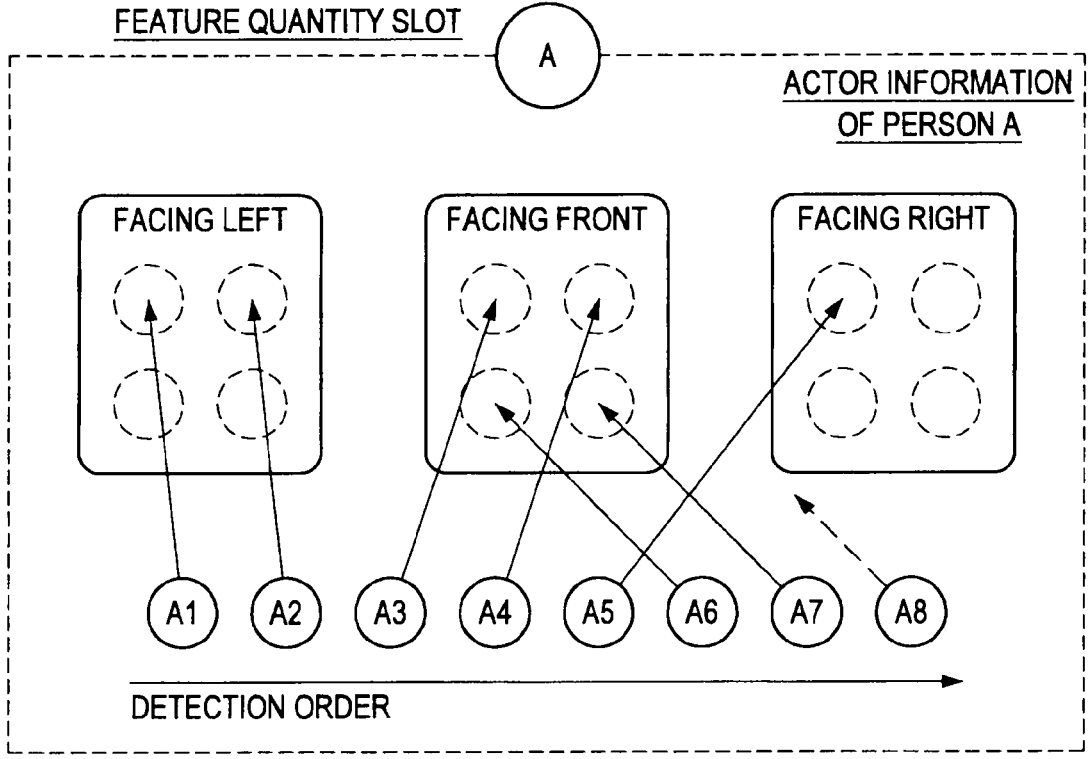

FIG.17
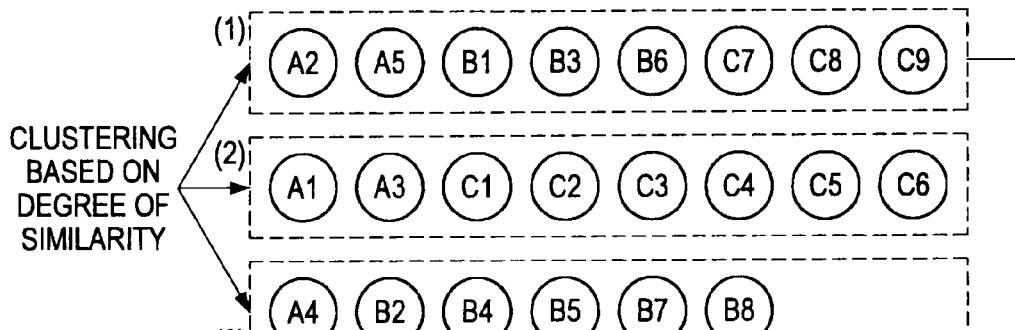
(CLASSIFICATION BASED ON FACE DIRECTION)
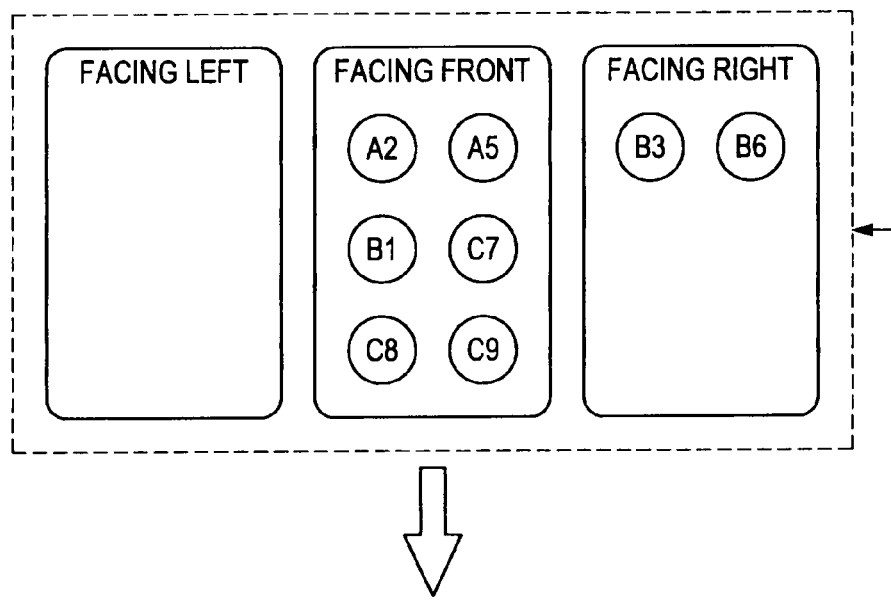
- CALCULATE WEIGHTING COEFFICIENT ACCORDING TO NUMBER OF PIECES FOR EACH FACE DIRECTION
  ex.) NUMBER OF PIECES (L:0,C:6,R:2) → ex.) COEFFICIENT (L=0,C=1,R=1/4)
- CALCULATE SCORE FOR EACH ACTOR INFORMATION, AND SELECT ACTOR INFORMATION WITH HIGHEST SCORE AS TEMPORARY REPRESENTATIVE
  ex.) SCORE (A:1*2=2, B:1*1+0.25*2=1.5, C:1*3=3)
TEMPORARY REPRESENTATIVE : 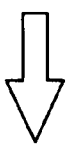

FIG. 22

(PERFORMANCE IMPROVEMENT MEASURE 1)

(1) OCCUPANCY BY SPECIFIC SECTION

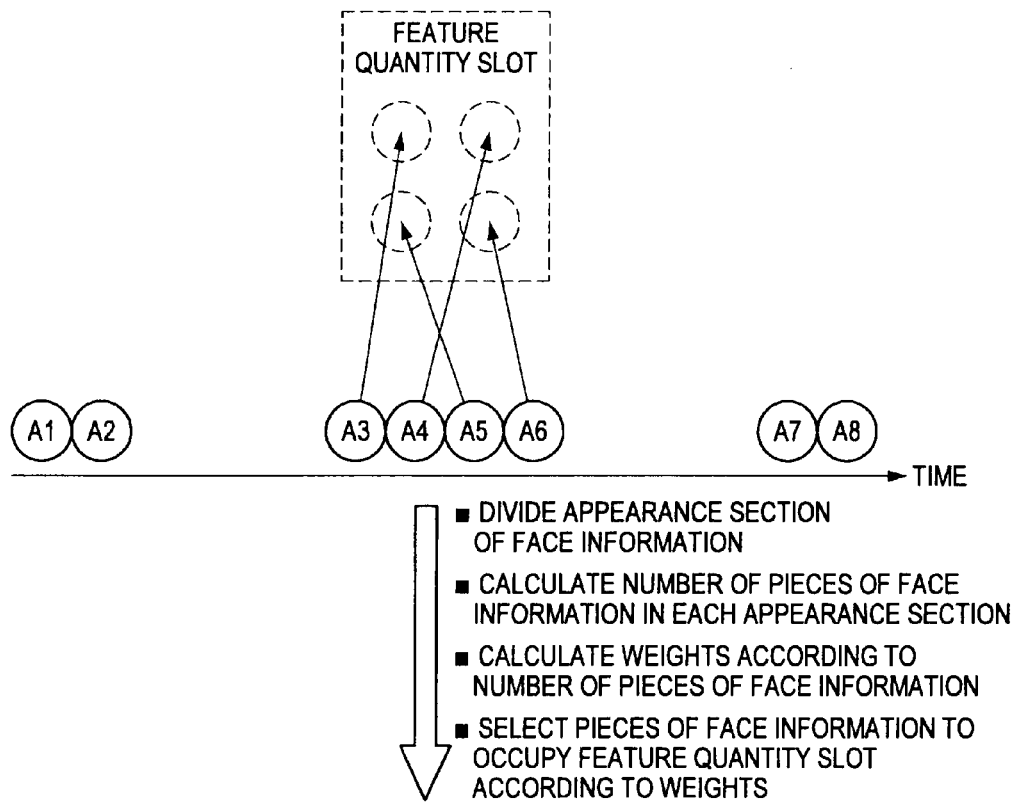

- DIVIDE APPEARANCE SECTION OF FACE INFORMATION
- CALCULATE NUMBER OF PIECES OF FACE INFORMATION IN EACH APPEARANCE SECTION
- CALCULATE WEIGHTS ACCORDING TO NUMBER OF PIECES OF FACE INFORMATION
- SELECT PIECES OF FACE INFORMATION TO OCCUPY FEATURE QUANTITY SLOT ACCORDING TO WEIGHTS (2) DISPERSION OF OCCUPYING SECTIONS

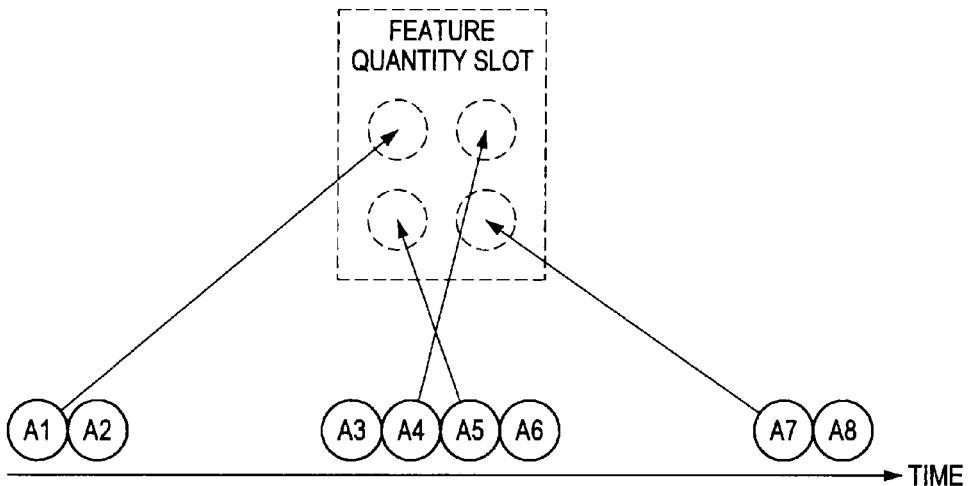

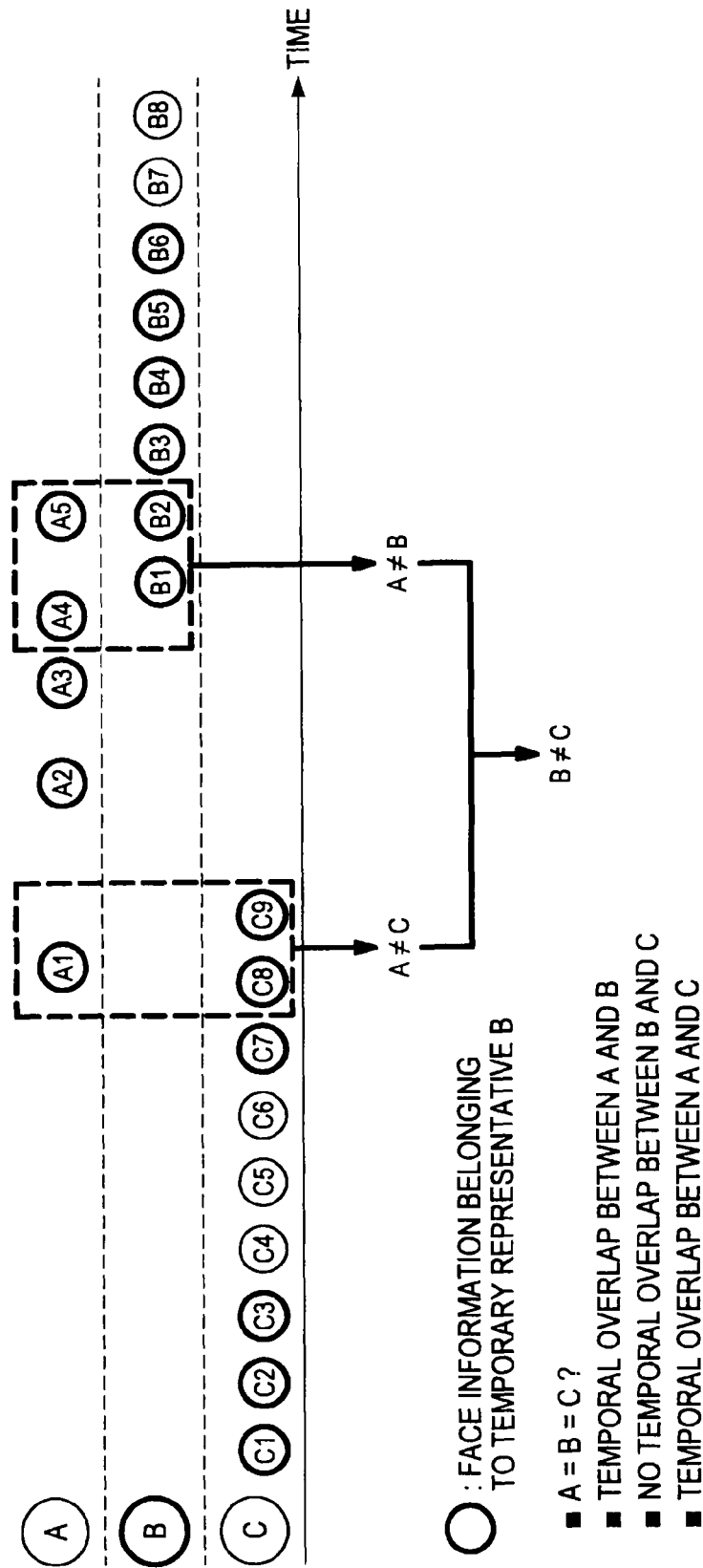

FACE CLUSTERING DEVICE, FACE CLUSTERING METHOD, AND PROGRAM

BACKGROUND OF THE INVENTION

1. Field of the Invention

The present invention relates to a face clustering device, a face clustering method, and a program.

2. Description of the Related Art

In recent years, a method of efficiently managing face information of a character or the like included in a video is gaining attention. For example, JP-A-2009-81883 discloses a method of providing resource data for enabling a user to easily grasp face information of a character included in a video and the appearance scene of the character. Also, JP-A-2010-3021 discloses a method of realizing acceleration and accuracy enhancement of face clustering by aggregating face information of one same person at the time of detecting face information included in a video and removing face information not suited for face clustering from the aggregated face feature quantities.

SUMMARY OF THE INVENTION

However, a large memory capacity and a high computational power are necessary to perform face clustering taking as targets all the pieces of face information of characters included in a video. In light of the foregoing, it is desirable to provide a face clustering device, a face clustering method, and a program which are novel and improved, and which are capable of clustering face information with more efficiency and higher accuracy.

According to an embodiment of the present invention, there is provided a face clustering device which includes a face detection unit for detecting a face included in an image, a face-direction detection unit for detecting a direction of the face detected by the face detection unit, a face identification unit for detecting, taking into account the direction of the face detected by the face-direction detection unit, a face with a similar feature and forming a collection of pieces of face information showing a feature of this face, a unit group setting unit for narrowing down, for each collection of pieces of face information formed by the face identification unit, the number of pieces of face information to a number set in advance for each face direction based on the direction of the face detected by the face-direction detection unit and setting each collection of pieces of face information for which the number has been narrowed down as a unit group, and a clustering unit for performing, with the unit group set by the unit group setting unit as a unit, clustering based on pieces of face information included in each unit group.

When the unit group set by the unit group setting unit is expressed as a first unit group and a unit group set based on a k-th (k=1 to N) unit group is expressed as a (k+1)-th unit group, the clustering unit may sequentially perform, for k=2 to N, a step of, while taking a unit group, among the first unit group, present in each of sections divided by a predetermined first time $T_1$ as a target, merging unit groups with a similar feature and setting a second unit group, and while taking a unit group, among the k-th unit group, present in each of sections divided by a predetermined k-th time $T_k$ ($T_k > T_{k-1}$) as a target, merging unit groups with a similar feature and setting a (k+1)-th unit group.

The clustering unit may include a first merge unit that merges, taking each piece of face information set in all the unit groups as a target, the unit groups with a similar feature based on a degree of similarity of the each piece of face information, and a second merge unit that merges, using a piece of face information set in each individual unit group, the unit groups with a similar feature based on a degree of similarity of the each individual unit group. The first merge unit may perform, with an i-th ($1 \le i \le N$) unit group as a target, a step of merging unit groups with a similar feature, and the second merge unit may perform, with a j-th ($j \ne i$) unit group as a target, a step of merging unit groups with a similar feature.

The clustering unit may be configured not to merge two unit groups corresponding to a substantially same time.

When performing the step of merging unit groups with a similar feature with the i-th ($1 \le i \le N$) unit group as a target, the first merge unit may repeatedly perform the step until merging occurs no more.

The unit group setting unit may narrow down the number of pieces of face information so that pieces of face information corresponding to separate times are likely to be set in a same unit group.

The second merge unit may perform, with at least the first unit group as a target, a step of merging unit groups with a similar feature.

When merging unit groups with a similar feature, the clustering unit may maintain pieces of face information set in unit groups before merging and hierarchy information showing correspondence relationships between the unit groups before merging and a unit group after merging.

According to another embodiment of the present invention, there is provided a face clustering method which includes the steps of detecting a face included in an image, detecting a direction of the face detected in the step of detecting a face, detecting, taking into account the direction of the face detected in the step of detection a direction, a face with a similar feature and forming a collection of pieces of face information showing a feature of this face, narrowing down, for each collection of pieces of face information formed in the step of detecting and forming, the number of pieces of face information to a number set in advance for each face direction based on the direction of the face detected in the step of detecting a direction, and setting each collection of pieces of face information for which the number has been narrowed down as a unit group, and performing, with the unit group set in the step of narrowing down and setting as a unit, clustering based on pieces of face information included in each unit group.

According to another embodiment of the present invention, there is provided a program for causing a computer to realize a face detection function of detecting a face included in an image, a face-direction detection function of detecting a direction of the face detected by the face detection function, a face identification function of detecting, taking into account the direction of the face detected by the face-direction detection function, a face with a similar feature and forming a collection of pieces of face information showing a feature of this face, a unit group setting function of narrowing down, for each collection of pieces of face information formed by the face identification function, the number of pieces of face information to a number set in advance for each face direction based on the direction of the face detected by the face-direction detection function and setting each collection of pieces of face information for which the number has been narrowed down as a unit group, and a clustering function of performing, with the unit group set by the unit group setting function as a unit, clustering based on pieces of face information included in each unit group.

According to another embodiment of the present invention, there is provided a recording medium in which the program is recorded, the recording medium being able to be read by a computer.

According to the embodiments of the present invention described above, it is possible to cluster face information with more efficiency and higher accuracy.

BRIEF DESCRIPTION OF THE DRAWINGS

FIG. 13 is an explanatory diagram for describing the face clustering method according to the embodiment (configuration of actor information);

FIG. 17 is an explanatory diagram for describing the face clustering method according to the embodiment (first clustering scheme);

FIG. 22 is an explanatory diagram for describing the face clustering method according to the embodiment (performance improvement measure 1);

FIG. 23 is an explanatory diagram for describing the face clustering method according to the embodiment (performance improvement measure 2);

DETAILED DESCRIPTION OF THE EMBODIMENT(S)

Figure 1:
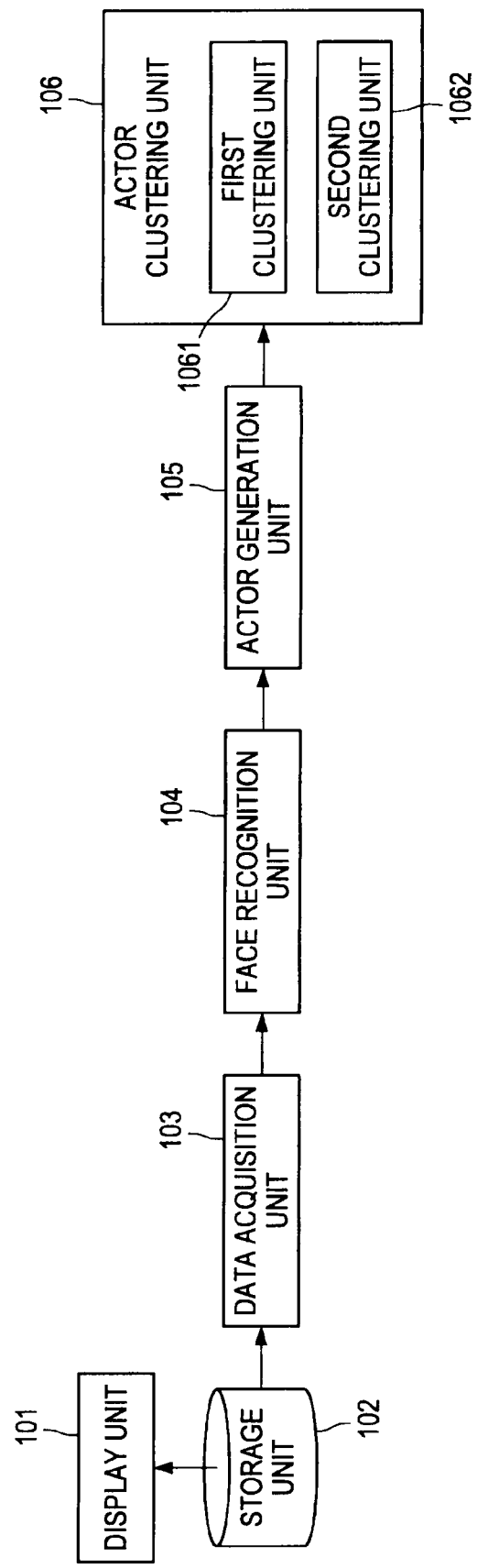
FIG. 1 is an explanatory diagram for describing an example functional configuration of an information processing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Description]

The flow of description of an embodiment of the present invention to be described below will be briefly mentioned here. First, a functional configuration of an information processing apparatus 100 according to the embodiment will be briefly described with reference to FIG. 1. Then, an operation of the information processing apparatus 100 and a face clustering method according to the embodiment will be described in detail with reference to FIGS. 2 to 25. Then, an example hardware configuration of the information processing apparatus 100 will be described with reference to FIG. 26. Lastly, the technical idea of the embodiment will be summarized and operational effects obtained from the technical idea will be briefly described.

(Description Items)

1: Embodiment 1-1: Configuration of Information Processing Apparatus 100

1-2: Operation of Information Processing Apparatus 100 (Face Clustering Method)

1-2-1: First Clustering Scheme 1-2-2: Second Clustering Scheme 1-2-3: Application Step 1-3: Performance Improvement Measure 1-3-1: Performance Improvement Measure 1

1-3-2: Performance Improvement Measure 2

1-3-3: Performance Improvement Measure 3

1-3-4: Performance Improvement Measure 4

1-4: Example Hardware Configuration

2: Summary

1: Embodiment

An embodiment of the present invention will be described. The present embodiment relates to a method of clustering information on a person (for example, face information or the like) detected from an image sequence such as continuous shots or a video (hereinafter, face clustering method). Particularly, the present embodiment relates to a method of managing in predetermined units (hereinafter, actor) information on a person detected from the image sequence. In the following, a method of clustering face information will be described, taking the face information as a concrete example of the information on a person.

[1-1: Configuration of Information Processing Apparatus 100]

First, an example functional configuration of an information processing apparatus 100 capable of realizing the face clustering method according to the present embodiment will be briefly described with reference to FIG. 1. FIG. 1 is an explanatory diagram showing an example functional configuration of the information processing apparatus 100.

As shown in FIG. 1, the information processing apparatus 100 mainly includes a display unit 101, a storage unit 102, a data acquisition unit 103, a face recognition unit 104, an actor generation unit 105, and an actor clustering unit 106. Furthermore, the actor clustering unit 106 includes a first clustering unit 1061 and a second clustering unit 1062.

The display unit 101 is means for displaying an image. For example, the display unit 101 reads an image sequence stored in the storage unit 102 and displays the same. Also, the display unit 101 displays a face image extracted from the image sequence. Furthermore, the display unit 101 displays, for each character, a section where a face image appears in the image sequence and a face image corresponding to the section. The storage unit 102 is means for holding data. For example, the storage unit 102 holds each image forming the image sequence. Also, the storage unit 102 holds a face image in the image sequence extracted or selected by the face recognition unit 104, the actor clustering unit 106, or the like described later.

The data acquisition unit 103 acquires each image forming the image sequence from the storage unit 102. Here, in the case the image held by the storage unit 102 is encoded, the data acquisition unit 103 decodes the image acquired from the storage unit 102. For example, in the case the image sequence is encoded by an encoding scheme such as MPEG-2, MPEG-4, H.264/AVC or the like, the data acquisition unit 103 decodes each image based on the corresponding encoding scheme. Also, in the case each image forming the image sequence is encoded by an encoding scheme such as JPEG or the like, the data acquisition unit 103 decodes each image based on the corresponding encoding scheme. Each image acquired by the data acquisition unit 103 from the storage unit 102 in this manner is input to the face recognition unit 104.

The face recognition unit 104 detects a face image included in each image input from the data acquisition unit 103. A learner, having an image as an input, capable of deciding "faceness" may be used for detection of the face image. For example, by creating a plurality of weak learners based on a Haar-like feature and applying the weak learners to adaptive boosting (AdaBoost), a learner for calculating the "faceness" can be obtained (see JP-A-2010-3021). However, the detection method of a face image is not limited to such. For example, a method of creating a plurality of weak learners based on combinations of luminance differences between two pixels (hereinafter, pixel difference features) and applying the weak learners to the adaptive boosting is also conceivable.

By using such boosting method, the direction, the three-dimensional location or the like of a face corresponding to a face image can be detected, or a face image having a similar feature can be detected. The face recognition unit 104 detects a face image included in each image by using the method as described above. Also, the face recognition unit 104 detects the direction, the three-dimensional location or the like of a face corresponding to each face image. Then, the face recognition unit 104 detects face images having a similar feature among face images appearing in the image sequence. Then, the face recognition unit 104 allots same identification information (hereinafter, face ID) to the face images having a similar feature, and manages the face images in association with the times of detection of the face images (hereinafter, detection time). For example, a face ID, a detection time, face information, and the like, are associated with each face image.

Additionally, the face information described above is a feature quantity indicating a feature of a face image. For example, the face information includes the direction of a face, the three-dimensional location of the face, age, sex, pixel difference feature, and the like. Additionally, age, sex and the like can also be detected by machine learning such as the boosting method described above. Furthermore, a configuration is also possible where a user allots information such as age and sex to a face image detected by face detection. As such, information for comparing degrees of similarity between face images is included in the face information described above. Thus, making a good use of the face information will enable to decide whether face images detected from the image sequence are of the same person or not.

A face image detected by the face recognition unit 104 in the above manner and a face ID, a detection time and face information corresponding to the face image are input to the actor generation unit 105. The actor generation unit 105 is means for generating a target (actor) of clustering of the face clustering method of the present embodiment. The actor here corresponds to each person appearing in the image sequence. That is, the actor generation unit 105 generates actor information indicating a feature of each actor. The actor information is formed from a collection of face information detected by the face recognition unit 104.

Figure 12:
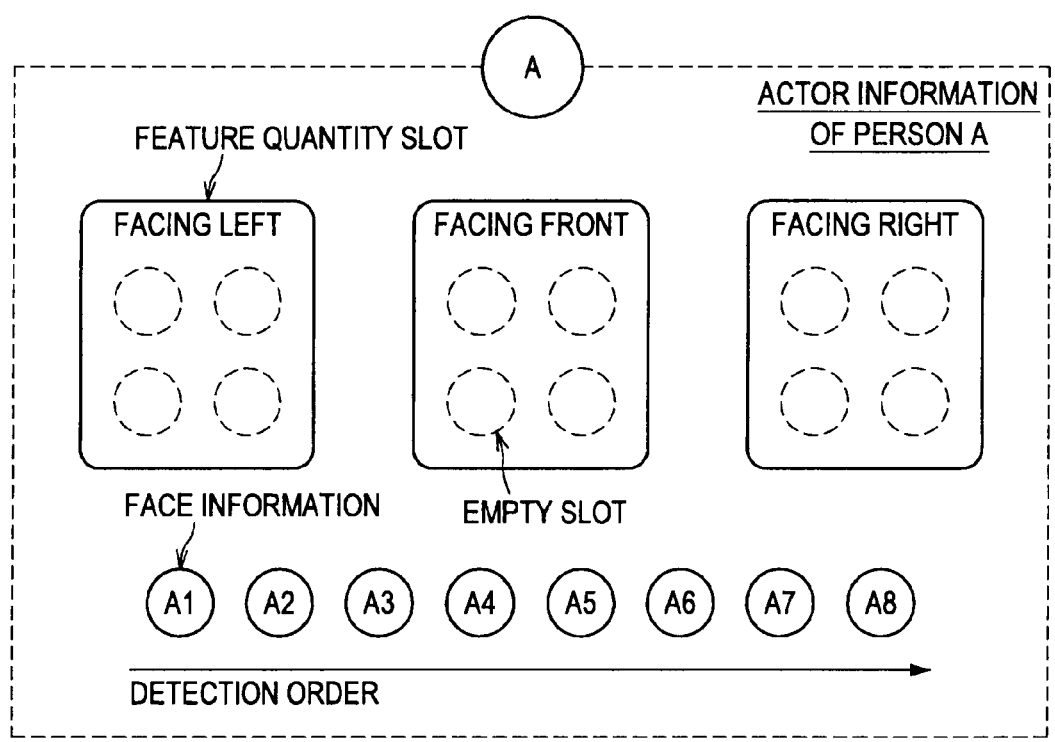
FIG. 12 is an explanatory diagram for describing the face clustering method according to the embodiment (configuration of actor information)

Here, an example of actor information corresponding to person A will be shown in FIG. 12. As shown in FIG. 12, the actor information has a predetermined number of feature quantity slots to which face information will be assigned. Additionally, the feature quantity slot corresponds to a memory area to which face information will be assigned. The type and number of feature quantity slots provided in the actor information can be set arbitrarily. In the example of FIG. 12, three feature quantity slots corresponding to three directions of a face (facing left, facing front, facing right) are provided for one piece of actor information. In the case of the present embodiment, the number of pieces of face information that can be assigned to each feature quantity slot is limited to a predetermined number. Thus, even if an extremely large number of face images are detected from an image sequence, the number of pieces of face information characterizing one actor is limited.

In FIG. 12, pieces of face information of face ID=A are shown in the order of detection time. In the description below, numbers starting from 1 are given in the order of detection time from the earliest, and face ID of the face information and detection times (order of detection) are shown together by the expressions A1, A2, . . . , A8, for example. Furthermore, in the example of FIG. 12, four empty slots (memory areas to which face information can be assigned) are provided for each feature quantity slot. Thus, maximum four pieces of face information can be assigned to each feature quantity slot. Giving an explanation based on the example of FIG. 12, the actor generation unit 105 classifies, according to the direction of the face, the pieces of face information arranged in a time series, as shown in FIG. 13 (Step. 1). Next, the actor generation unit 105 assigns, in the order of detection time, face information to a feature quantity slot corresponding to the direction of the face (Step. 2).

Figure 14:
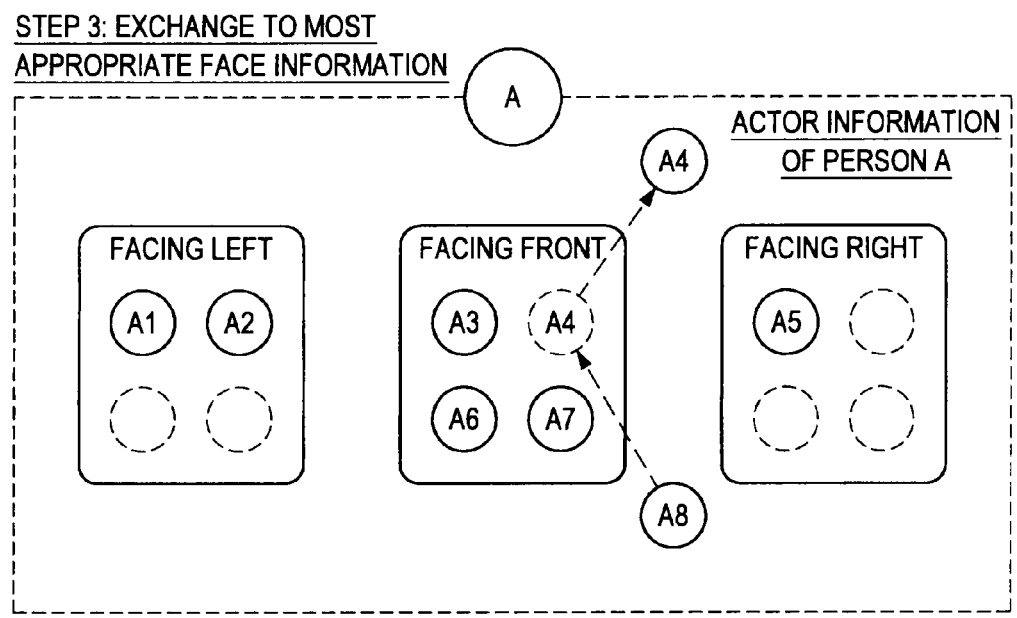
FIG. 14 is an explanatory diagram for describing the face clustering method according to the embodiment (configuration of actor information)

However, since the number of pieces of face information that can be assigned to each feature quantity slot is limited, face information coming later in the detection time order is not assigned to the feature quantity slot. Thus, as shown in FIG. 14, the actor generation unit 105 compares face information already assigned to the feature quantity slot (hereinafter, existing face information) and face information to be assigned to the feature quantity slot (hereinafter, new face information), and selects the most appropriate face information. For example, the actor generation unit 105 compares new face information A8 against existing pieces of face information A3, A4, A6 and A7, and if the new face information A8 is determined to be more appropriate than the existing face information A4, the actor generation unit 105 selects the new face information A8. Then, the actor generation unit 105 replaces the existing face information A4 with the new face information A8 (Step. 3).

Additionally, at the time of selecting the most appropriate face information, the actor generation unit 105 compares, between the existing face information and the new face information, a score such as "faceness," "likeness to person A's face," "degree of similarity to another face information," or the like, and selects face information with a higher score. A "face facing almost front" or a "less blurry or less out-of-focus face" with which it is easier to distinguish the face may be preferentially selected. The actor generation unit 105 generates the actor information by repeating the process of Step 3 shown in FIG. 14. Additionally, the actor generation unit 105 generates the actor information for each face ID. Accordingly, each piece of actor information is characterized by the face ID, face information assigned to the feature quantity slot, and the like. Also, a configuration is shown in FIGS. 12 to 14 where the feature quantity slot is provided for each "face direction," but it is not limited to such an example.

Figure 15:
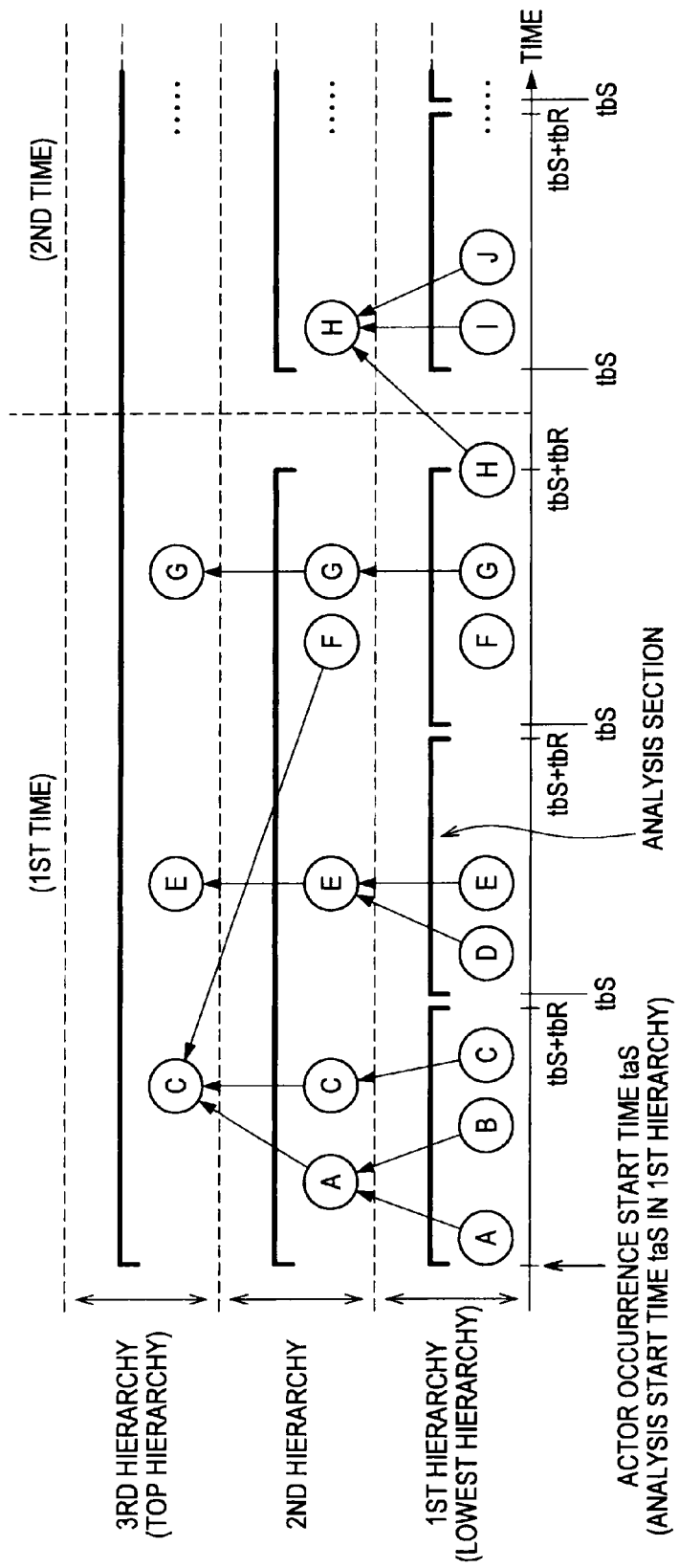
FIG. 15 is an explanatory diagram for describing the face clustering method according to the embodiment (preliminary-final scheme)

FIG. 1 will be referred to again. The actor information generated by the actor generation unit 105 in the above manner is input to the actor clustering unit 106. The actor clustering unit 106 performs narrowing down of the actor by performing clustering on a per-actor basis. The actor clustering unit 106 according to the present embodiment performs narrowing down of the actor by a hierarchical clustering scheme (hereinafter, preliminary-final scheme), as shown in FIG. 15. First, the actor clustering unit 106 takes time taS of when an the actor (face image) is first detected as analysis start time tbS, and selects actors included in predetermined period tbR from the analysis start time tbS (hereinafter, analysis section) as the targets of clustering.

In the example of FIG. 15, actors B and C are included in the analysis section including actor A. In this case, the actor clustering unit 106 performs clustering with actors A, B and C as the targets. Similarly, E is included in the analysis section including actor D, and thus the actor clustering unit 106 performs clustering with actors D and E as the targets. Furthermore, G is included in the analysis section including actor F, and thus the actor clustering unit 106 performs clustering with actors F and G as the targets. Additionally, since actor H does not fit into the analysis section including actor F (for example, H7 and H8, among H1 to H8, are left out of the analysis section), it will be made the target of clustering in the next analysis section.

Clustering in the first hierarchy is performed in this manner, and actors with similar features are merged. In the example of FIG. 15, actor B is merged with actor A, actor D is merged with actor E, and actors I and J are merged with actor H. Merge here means to reassign face information assigned to the feature quantity slot of the actor information corresponding to an actor which is a merge target to the feature quantity slot of the actor information corresponding to an actor after merging (for example, see FIG. 25). For example, in the case of merging actor D to which face information D1 and D2 are assigned with actor E whose number of slots is 2 and which is assigned with face information E1, two pieces of face information that are most appropriate are selected from face information E1, D1 and D2 and are assigned to actor E after merging.

When clustering of the actor groups in the first hierarchy is complete, the actor clustering unit 106 performs clustering in the second hierarchy with the actor groups after merging as the targets. Here, the length of the analysis section in the second hierarchy is set to be longer than the analysis section in the first hierarchy. When clustering in the second hierarchy is complete, the actor clustering unit 106 stores information on the actor groups which have been merged by the clustering in the second hierarchy (actor group in the third hierarchy) in the storage unit 102. Additionally, although a case of three hierarchies is shown in FIG. 15, the number of hierarchies may be set to four or more. Furthermore, the method of clustering in each hierarchy will be described later.

The actor groups in the top hierarchy merged by the clustering scheme as described above are assumed to represent same persons. Accordingly, the display unit 101 displays appearance scenes of face images corresponding to respective actors in the top hierarchy for each of the actors. With the appearance scenes displayed for each actor, a user is enabled to easily grasp which person appears in which time slot in the image sequence. Additionally, the clustering scheme described above is performed taking actor information with a limited number of slots as the unit, and thus the number of pieces of face information to be analysed at the time of determining similarity between actors can be kept small and conditions such as a memory capacity and a computational power necessary for realizing the scheme can be relaxed.

In the foregoing, a functional configuration of the information processing apparatus 100 according to the present embodiment has been briefly described. However, a detailed explanation of the clustering scheme has been omitted in the explanation above. Thus, in the following, a detailed description of the face clustering method will be made together with a description of an operation of the information processing apparatus 100. Additionally, the functions of the first clustering unit 1061 and the second clustering unit 1062 included in the actor clustering unit 106 will be described later.

[1-2: Operation of Information Processing Apparatus 100 (Face Clustering Method)]

In the following, an operation of the information processing apparatus 100 and the face clustering method according to the present embodiment will be described in detail with reference to FIGS. 2 to 25. Additionally, the face clustering method according to the present embodiment relates to the clustering scheme based on the actor information (see FIGS. 12 to 14) described above.

Figure 2:
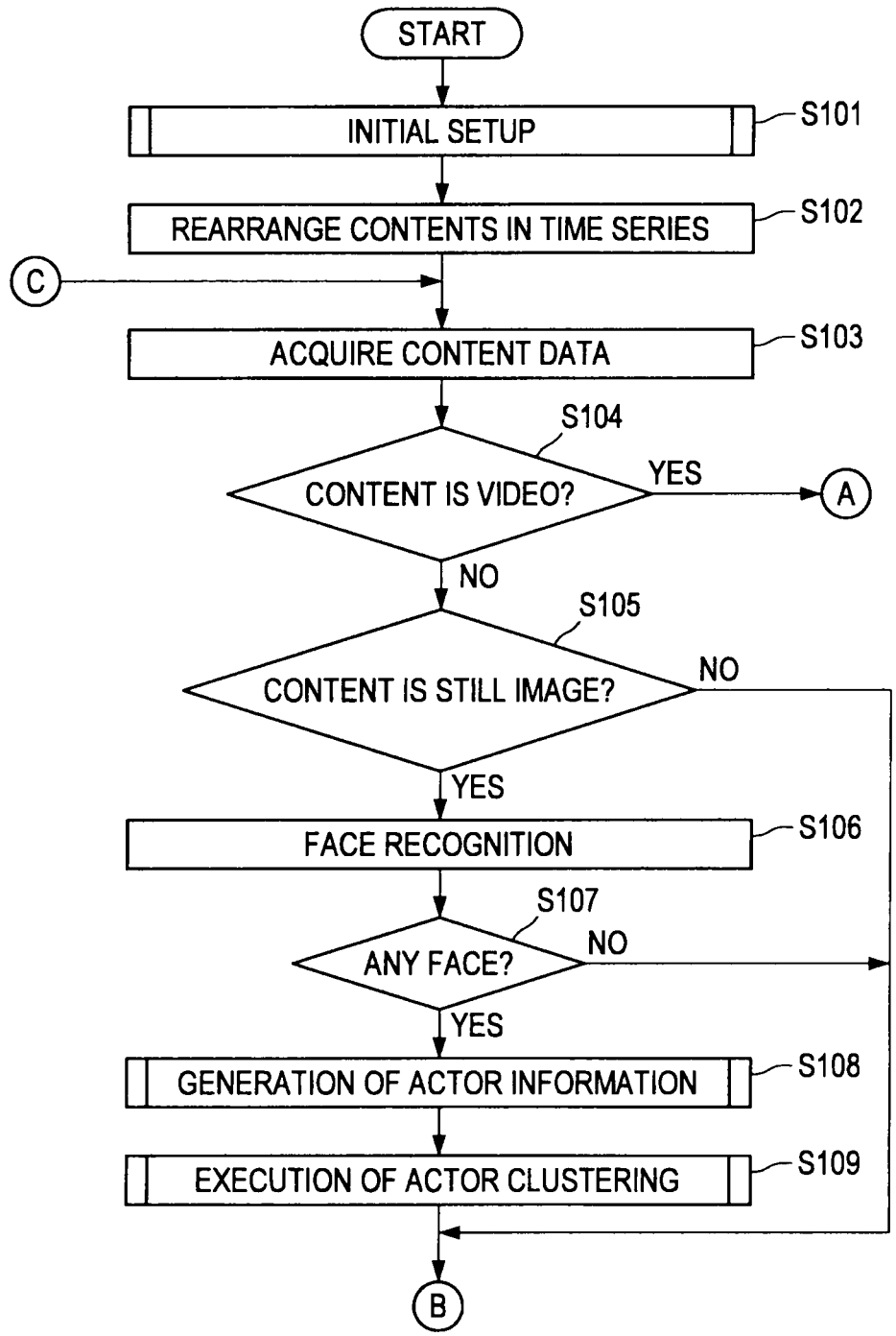
FIG. 2 is an explanatory diagram for describing a face clustering method according to the embodiment (overall processing flow)
Figure 5:
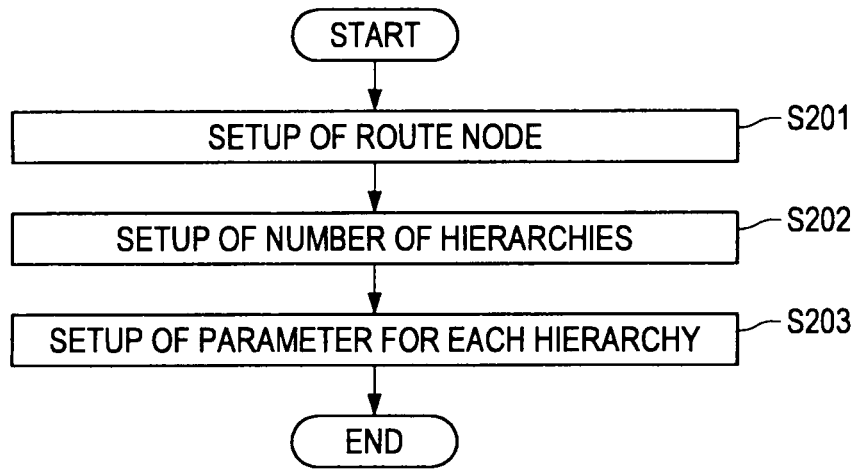
FIG. 5 is an explanatory diagram for describing the face clustering method according to the embodiment (initial setup)

As shown in FIG. 2, the information processing apparatus 100 performs initial setup (S101). As shown in FIG. 5, this initial setup is performed in three steps, namely, setup of a route node (S201), setup of number of hierarchies (S202), and parameter setup for each hierarchy (S203). As has been described, the face clustering method according to the present embodiment is based on the preliminary-final scheme shown in FIG. 15. To realize this preliminary-final scheme, setup of parameters, such as the number of hierarchies until the top hierarchy (number of execution times of clustering) and the length of an analysis section in each hierarchy, will be necessary. These parameters are set in step S101. Additionally, setup of parameters is performed by the information processing apparatus 100 based on an user input.

FIG. 2 will be referred to again. Following step S101, the information processing apparatus 100 rearranges contents in a time series by the function of the data acquisition unit 103 (S102). For example, in the case a plurality of videos and still images are included in the storage unit 102, the data acquisition unit 103 rearranges, based on time information allotted to data of the videos and the still images, the data stored in the storage unit 102. Next, the information processing apparatus 100 acquires content data such as a video or a still image from the storage unit 102 by the function of the data acquisition unit 103 (S103). Then, the information processing apparatus 100 decides whether the acquired content data is a video or not, by the function of the data acquisition unit 103 (S104).

Figure 3:
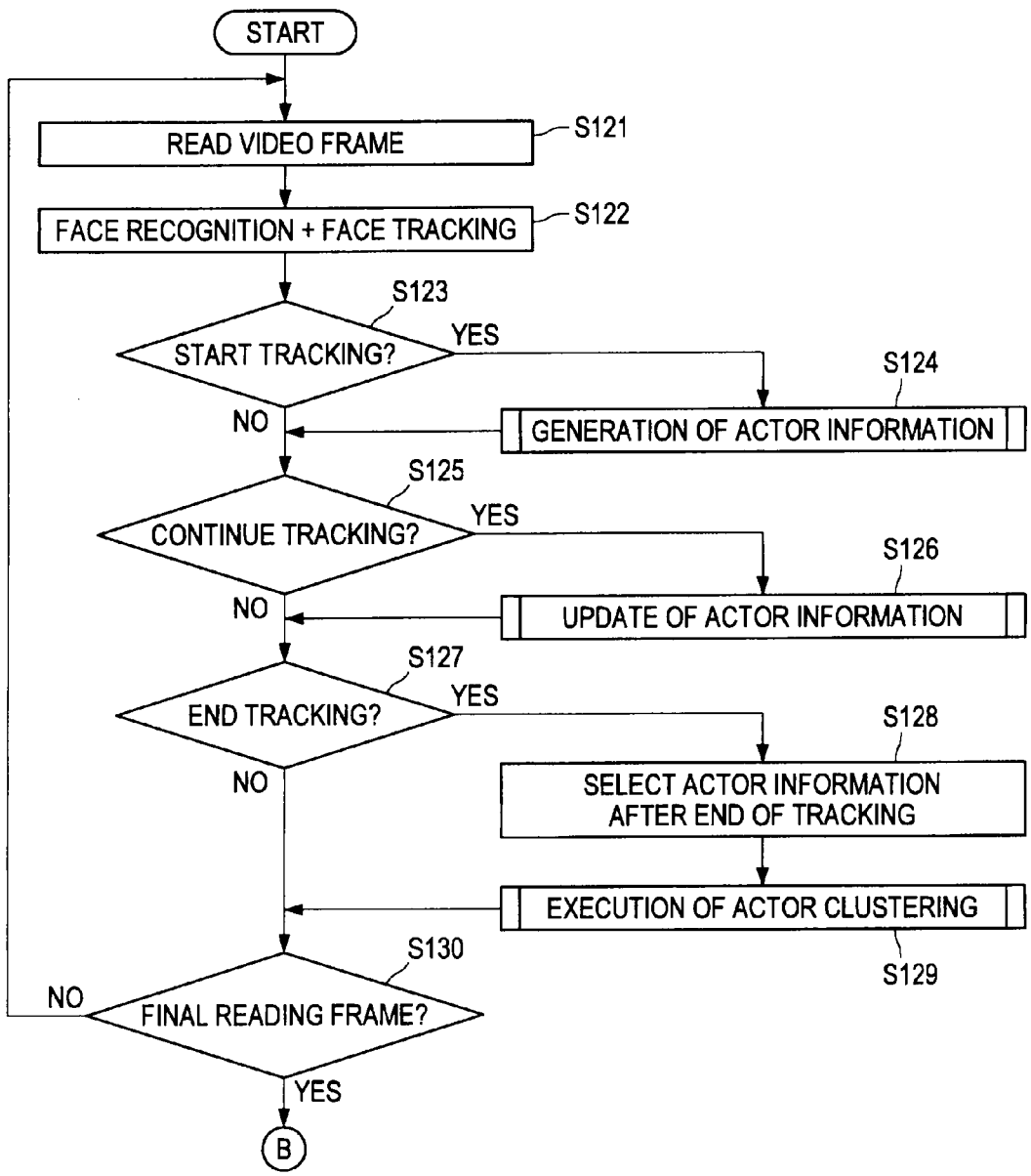
FIG. 3 is an explanatory diagram for describing the face clustering method according to the embodiment (overall processing flow)
Figure 4:
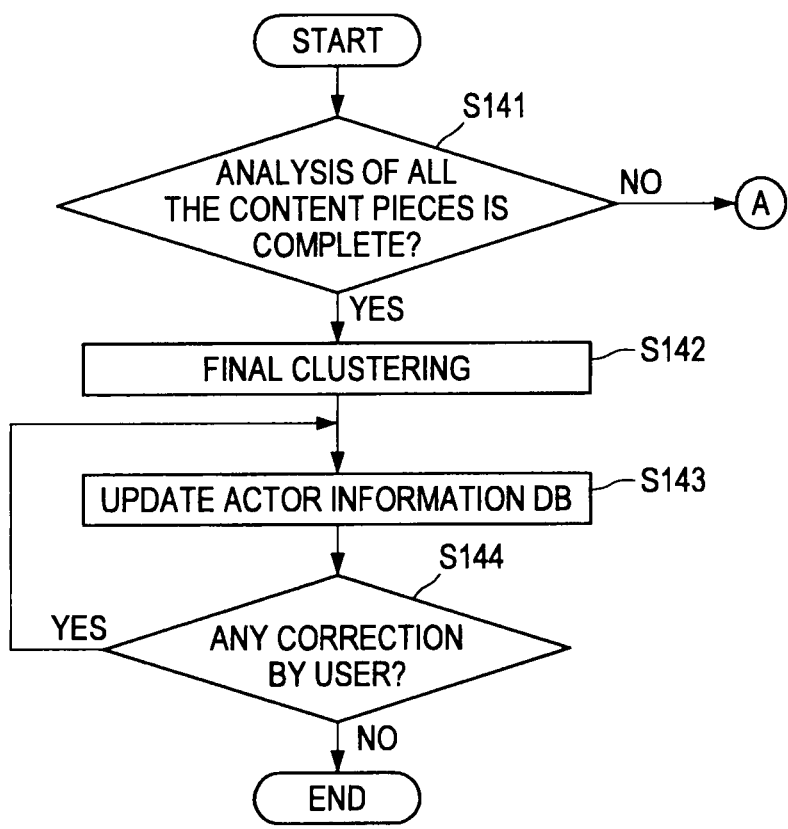
FIG. 4 is an explanatory diagram for describing the face clustering method according to the embodiment (overall processing flow)

In the case the content data is a video, the information processing apparatus 100 proceeds with the process to step S121 (FIG. 3). On the other hand, in the case the content data is not a video, the information processing apparatus 100 proceeds with the process to step S105. In the case the process proceeded to step S105, the information processing apparatus 100 decides whether the content data is a still image or not (S105). In the case the content data is a still image, the information processing apparatus 100 proceeds with the process to step S106. On the other hand, in the case the content data is not a still image, the information processing apparatus 100 proceeds with the process of step S141 (FIG. 4).

(Case where Content Data is Still Image)

In the case the process proceeded to step S106, the information processing apparatus 100 detects a face image from the still image by the function of the face recognition unit 104 (S106). Next, the information processing apparatus 100 decides whether a face image is detected from the still image or not (S107). In the case a face image is detected, the information processing apparatus 100 proceeds with the process to step S108. On the other hand, in the case a face image is not detected, the information processing apparatus 100 proceeds with the process to step S141 (FIG. 4).

In the case the process proceeded to step S108, the information processing apparatus 100 generates actor information by the function of the actor generation unit 105 (S108). Here, a flow of processes related to generation of actor information in step S108 will be supplementarily described with reference to FIG. 6.

Figure 6:
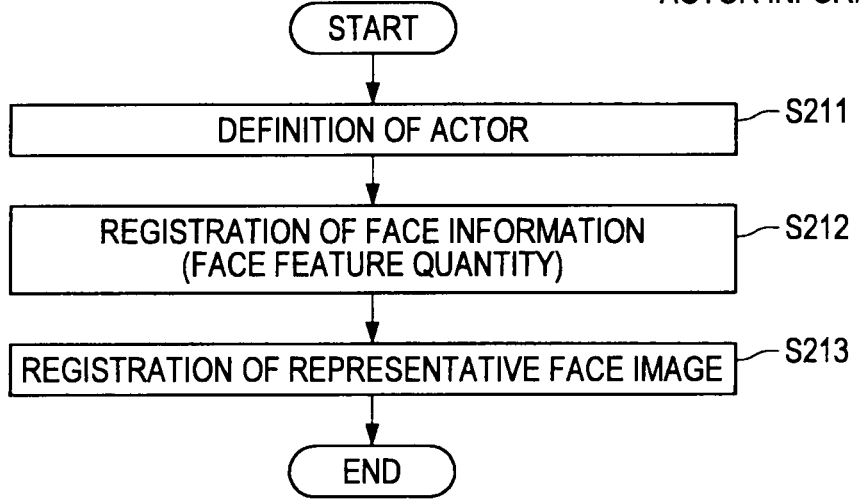
FIG. 6 is an explanatory diagram for describing the face clustering method according to the embodiment (generation of actor information)

As shown in FIG. 6, first, the actor generation unit 105 defines an actor (S211). For example, in the case a face image of person A is detected, the actor generation unit 105 generates a frame of the actor information of person A as shown in FIG. 12. For example, the actor generation unit 105 generates a frame of actor information which includes a plurality of feature quantity slots corresponding to the directions of the face and according to which it is possible to assign four pieces of face information to each feature quantity slot.

Next, the actor generation unit 105 assigns face information to a feature quantity slot forming the actor information in the manner shown as Step 1 to Step 3 shown in FIGS. 13 and 14 and performs registration of the face information (S212). Then, the actor generation unit 105 selects a face image representing each actor (hereinafter, representative face image), and registers the representative face image by associating the same with the actor information (S213). When the processes above are complete, the processes related to generation of actor information in step S108 in FIG. 2 are complete.

FIG. 2 will be referred to again. Following step S108, the information processing apparatus 100 performs clustering (hereinafter, actor clustering) based on the preliminary-final scheme by the function of the actor clustering unit 106 (S109). Here, the flow of processes related to actor clustering in step S109 will be supplementarily described with reference to FIG. 7.

Figure 7:
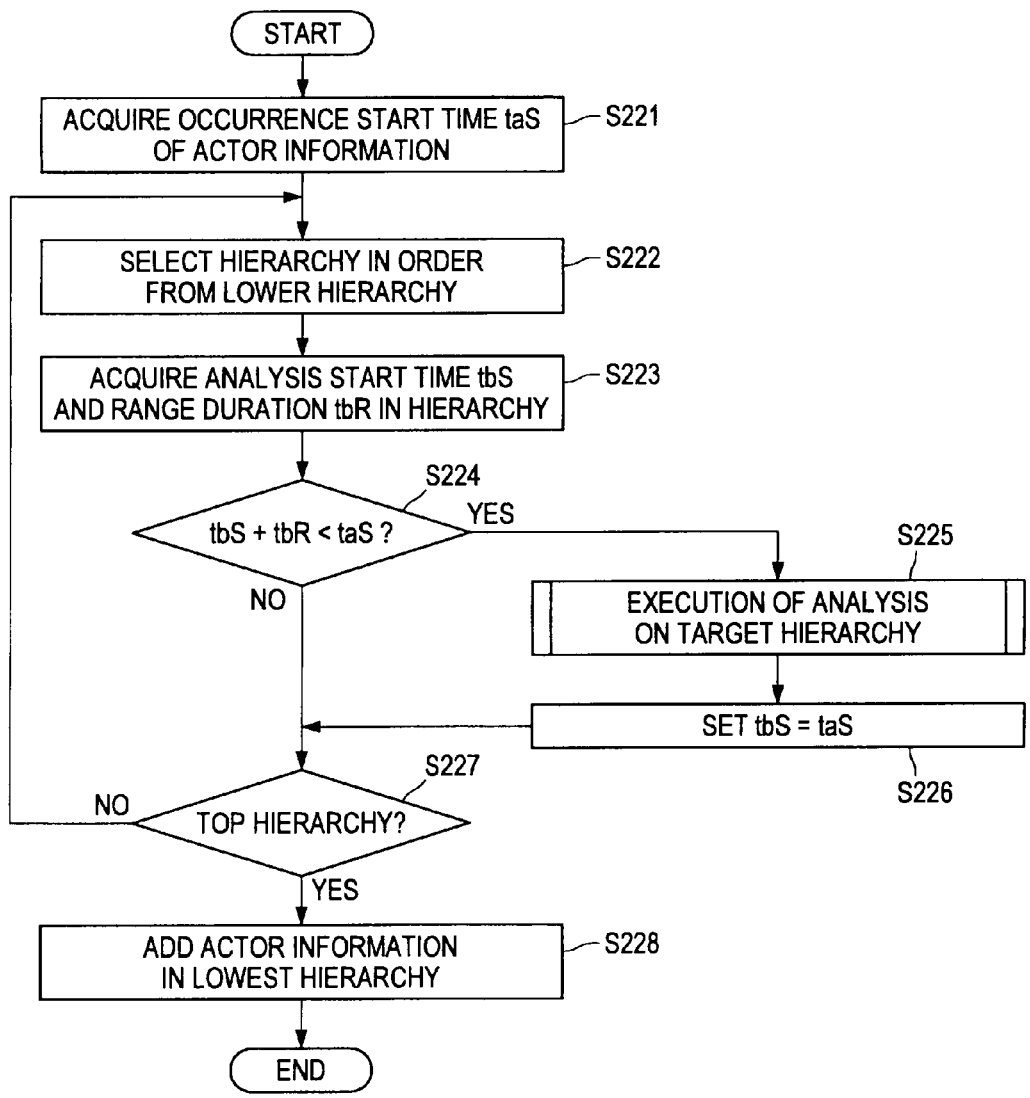
FIG. 7 is an explanatory diagram for describing the face clustering method according to the embodiment (execution of actor clustering)

As shown in FIG. 7, the actor clustering unit 106 acquires occurrence start time taS of an actor (see FIG. 15) (S221). Next, the actor clustering unit 106 sequentially selects a hierarchy to be the target of clustering in the order from a lower hierarchy (S222). Then, the actor clustering unit 106 acquires the analysis start time tbS in the hierarchy selected in step S222 and the length of the analysis section (range duration tbR) (S223). Then, the actor clustering unit 106 decides whether tbS+tbR is less than taS or not (S224). In the case tbS+tbR is less than taS, the actor clustering unit 106 proceeds with the process to step S225. On the other hand, in the case tbS+tbR is not less than taS, the actor clustering unit 106 proceeds with the process to step S227.

In the case the process proceeded to step S225, the actor clustering unit 106 performs analysis on the hierarchy which is the analysis target (hereinafter, target hierarchy) (S225). Here, the flow of processes related to analysis of a target hierarchy in step S225 will be supplementarily described with reference to FIG. 8.

Figure 8:
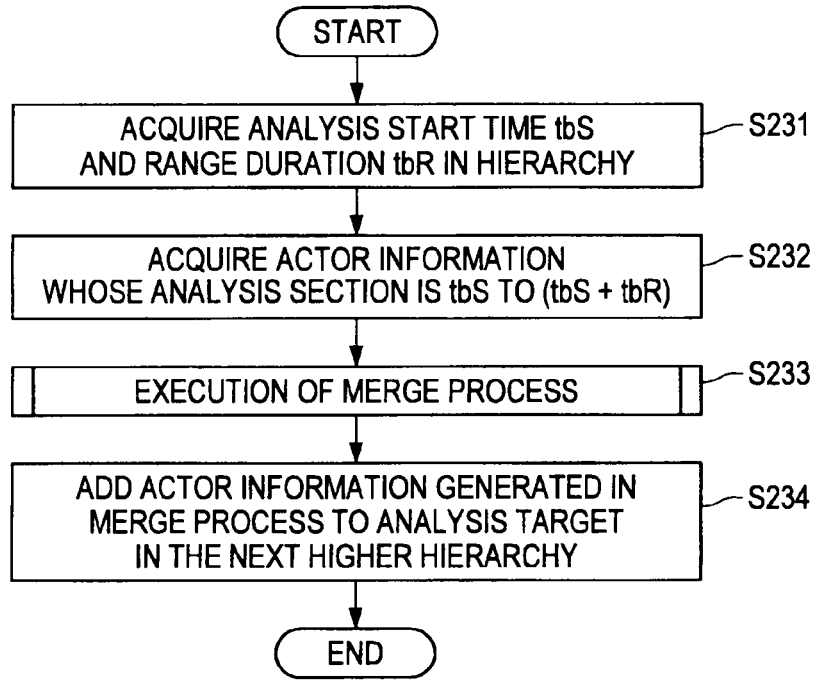
FIG. 8 is an explanatory diagram for describing the face clustering method according to the embodiment (execution of target hierarchy analysis)

As shown in FIG. 8, first, the actor clustering unit 106 acquires the analysis start time tbS and the range duration tbR in the target hierarchy (S231). Next, the actor clustering unit 106 acquires actor information included in an analysis section of time tbS to time (tbS+tbR) (S232). Then, the actor clustering unit 106 performs merge process of merging actors with a similar feature by using pieces of actor information acquired in step S232 (S233). Here, the flow of the merge process in step S233 will be supplementarily described with reference to FIG. 9.

Figure 9:
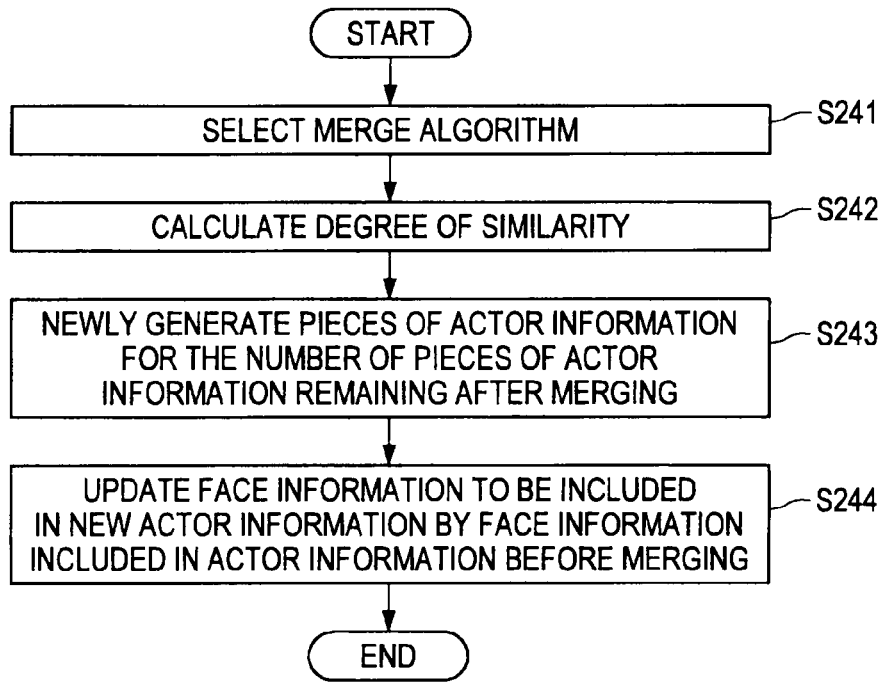
FIG. 9 is an explanatory diagram for describing the face clustering method according to the embodiment (execution of merge process)

As shown in FIG. 9, first, the actor clustering unit 106 selects a merge algorithm (first clustering scheme (see FIGS. 16 to 20), second clustering scheme (see FIG. 21)) (S241). Additionally, the first clustering scheme and the second clustering scheme will be described later. Next, the actor clustering unit 106 calculates the degree of similarity between actors by using the selected merge algorithm (S242). Then, the actor clustering unit 106 generates new frames of actor information for the number of pieces of actor information remaining after merging (S243). Then, the actor clustering unit 106 organizes pieces of face information included in the pieces of actor information before merging, selects appropriate pieces of face information to be included in the pieces of actor information after merging, and registers the respective pieces of face information in the new pieces of actor information (S244).

That is, the actor clustering unit 106 recognises actors with a high degree of similarity to be actors corresponding to the same person, and generates actor information corresponding to the actor. As has been described, the number of pieces of face information that can be assigned to the feature quantity slot of each piece of actor information is limited. Thus, the actor clustering unit 106 selects appropriate face information to be included in the actor information after merging from the pieces of face information included in the two pieces of actor information before merging, and assigns the selected face information to the new actor information. When the processes above are complete, the merge process in step S233 in FIG. 8 is complete.

FIG. 8 will be referred to again. When pieces of actor information are merged in step S233, the actor clustering unit 106 takes the actor information after merging as the analysis target in the next higher hierarchy (S234). When the processes above are complete, the analysis process in step S225 in FIG. 7 is complete.

FIG. 7 will be referred to again. Following step S225, the actor clustering unit 116 sets tbS equal to taS (S226), and proceeds with the process to step S227. When the process proceeds to step S227, the actor clustering unit 106 decides whether the next higher hierarchy of the target hierarchy is the top hierarchy or not (S227). In the case it is the top hierarchy, the actor clustering unit 106 proceeds with the process to step S228. On the other hand, in the case it is not the top hierarchy, the actor clustering unit 106 moves the target hierarchy to the next higher hierarchy, and proceeds with the process to step S222.

In the case the process proceeded to step S228, the actor clustering unit 106 adds the actor information in the top hierarchy to the analysis target in the lowest hierarchy (S228). When the processes above are complete, the processes related to actor clustering in step S109 in FIG. 2 are complete. When the process of step S109 is complete, the information processing apparatus 100 proceeds with the process to step S141 (FIG. 4).

As shown in FIG. 4, the information processing apparatus 100 decides whether analysis of all the content pieces is complete or not (S141). In the case analysis of all the content pieces is complete, the information processing apparatus 100 proceeds with the process to step S142. On the other hand, in the case analysis of all the content pieces is not complete, the information processing apparatus 100 proceeds with the process to step S103 (FIG. 2). In the case the process proceeded to step S142, the information processing apparatus 100 performs final clustering process by the function of the actor clustering unit 106 (S142). Here, the flow of clustering process in step S142 will be supplementarily described with reference to FIG. 11.

Figure 11:
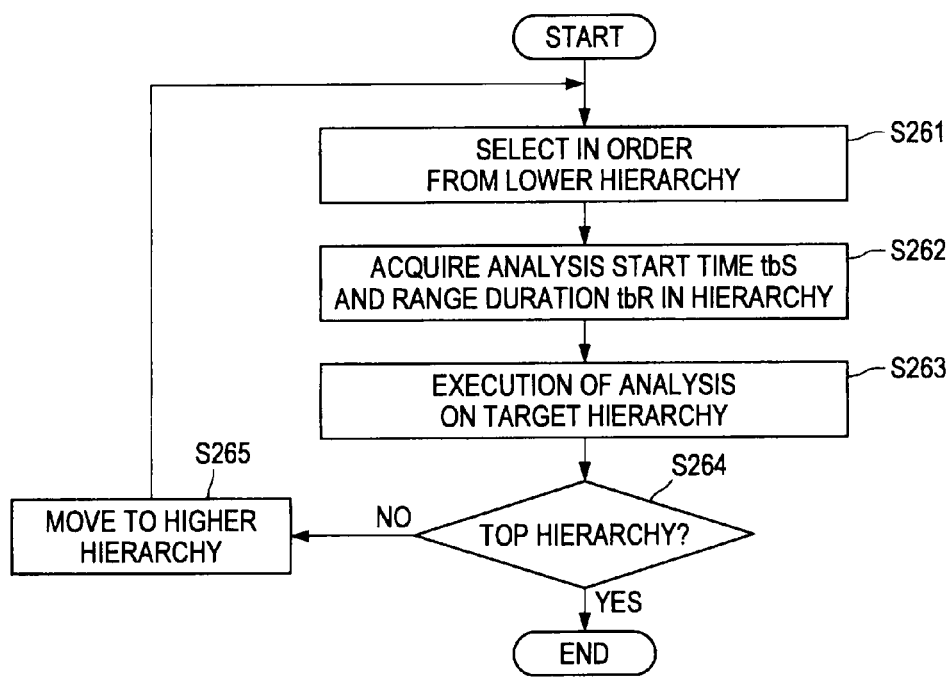
FIG. 11 is an explanatory diagram for describing the face clustering method according to the embodiment (final clustering)

As shown in FIG. 11, first, the actor clustering unit 106 selects a target hierarchy in the order from a lower hierarchy (S261). Next, the actor clustering unit 106 acquires the analysis start time tbS and the range duration tbR in the target hierarchy (S262). Then, the actor clustering unit 106 performs analysis on the target hierarchy (S263). The flow of processes related to analysis of the target hierarchy in step S263 is substantially the same as the process of step S225 (FIG. 7) already described with reference to FIG. 8.

Next, the actor clustering unit 106 decides whether the next higher hierarchy of the target hierarchy is the top hierarchy or not (S264). In the case it is the top hierarchy, the actor clustering unit 106 ends the clustering process related to step S142 in FIG. 4. On the other hand, in the case it is not the top hierarchy, the actor clustering unit 106 proceeds with the process to step S265. In the case the process proceeded to step S265, the actor clustering unit 106 moves the target hierarchy to the next higher hierarchy (S265), and proceeds with the process to step S261.

When the processes above are complete, the clustering process of step S142 in FIG. 4 is complete. FIG. 4 will be referred to again. Following step S142, the information processing apparatus 100 updates a database of actor information (hereinafter, actor information DB) stored in the storage unit 102 (S143). When the actor information DB is updated, the display unit 101 displays, based on the updated actor information DB, the face information of each actor, the appearance timing of the face information, and the like. Then, the information processing apparatus 100 decides, in response to such display contents, whether there is an input from a user to correct the actor information or not (S144). In the case there is an input for correction, the information processing apparatus 100 proceeds with the process to step S143. On the other hand, in the case there is no input for correction, the information processing apparatus 100 ends the series of processes.

(Case where Content Data is Video)

Now, in the case the content data is a video in step S104 in FIG. 2, the information processing apparatus 100 proceeds with the process to step S121 (FIG. 3).

As shown in FIG. 3, first, the information processing apparatus 100 reads a video frame from the storage unit 102 by the function of the data acquisition unit 103 (S121). At this time, if the video data stored in the storage unit 102 is encoded data, the data acquisition unit 103 decodes the video data and generates an uncoded video frame. Then, the information processing apparatus 100 detects a face image included in the video frame or detects the direction, the three-dimensional location or the like of the face by the function of the face recognition unit 104, for example (S122).

Next, the information processing apparatus 100 decides whether face tracking relating to the face image detected in step S122 is to be started or not, by the function of the face recognition unit 104 (S123). In the case of starting face tracking, the information processing apparatus 100 proceeds with the process to step S124. On the other hand, in the case of not starting face tracking, the information processing apparatus 100 proceeds with the process to step S125. In the case the process proceeded to step S124, the information processing apparatus 100 inputs a result of the face tracking by the face recognition unit 104, face information, or the like to the actor generation unit 105, and generates actor information (S124). The flow of processes related to generation of actor information in step S124 is substantially the same as step S108 (FIG. 2) already described with reference to FIG. 6.

When the process of step S124 is complete, the information processing apparatus 100 proceeds with the process to step S125. When the process proceeds to step S125, the information processing apparatus 100 decides whether to continue the face tracking or not (S125). In the case of continuing the face tracking, the information processing apparatus 100 proceeds with the process to step S126. On the other hand, in the case of not continuing the face tracking, the information processing apparatus 100 proceeds with the process to step S127. In the case the process proceeded to step S127, the information processing apparatus 100 updates the actor information by the function of the actor generation unit 105 (S127). Here, the flow of processes related to updating of the actor information in step S127 in FIG. 3 will be supplementarily described with reference to FIG. 10.

Figure 10:
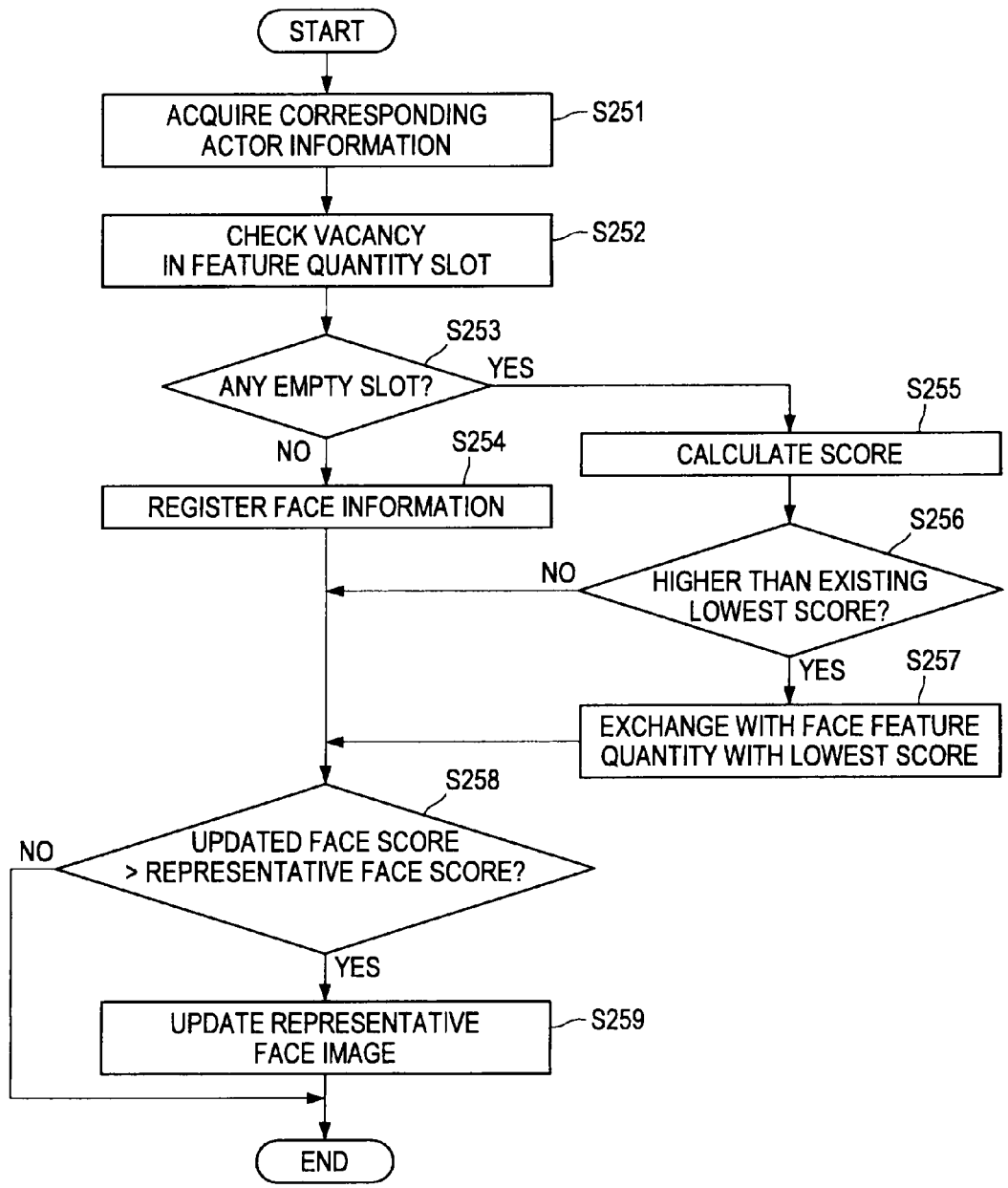
FIG. 10 is an explanatory diagram for describing the face clustering method according to the embodiment (updating of actor information)

As shown in FIG. 10, first, the actor generation unit 105 acquires actor information which is to be the target of update (S251). Next, the actor generation unit 105 checks vacancy in the feature quantity slots forming the acquired actor information (S252). Then, the actor generation unit 105 decides by the check of step S252 whether there is an empty slot or not (S253). In the case there is an empty slot, the actor generation unit 105 proceeds with the process to step S254. On the other hand, in the case there is no empty slot, the actor generation unit 105 proceeds with the process to step S255.

In the case the process proceeded to step S254, the actor generation unit 105 assigns face information to the vacancy in the feature quantity slots and registers the face information (S254), and proceeds with the process to step S258. On the other hand, in the case the process proceeded to step S255, the actor generation unit 105 calculates the score of the face information to be the update target (S255). That is, the actor generation unit 105 compares existing face information assigned to the feature quantity slot and the new face information, and calculates, as the feature quantity of the actor information, a score for selecting more appropriate face information.

For example, degrees of similarity between the new face information and all the existing pieces of face information are calculated, and the average value of the degrees of similarity is taken as the score of the new face information. Also, degrees of similarity between certain existing face information (target face information) and all the other existing pieces of face information are calculated, and the average value of the degrees of similarity is taken as the score of the target face information. That is, this score indicates the degree of similarity for a collection of pieces of face information collected as pieces of face information having a similar feature. Accordingly, face information with a high score strongly reflects the feature of the existing pieces of face information, and it can be said to be appropriate for the collection formed by the existing pieces of face information. Also, as the measure of scores other than the degree of similarity, the scores of a "face facing almost front" and a "less blurry or less out-of-focus face" with which it is easier to distinguish the face may be made high. Additionally, the score described above is not limited to the average value of the degree of similarities between pieces of face information or the value of the "face facing almost front" or the "less blurry or less out-of-focus face," and it may be any index as long as the degree of priority of face information to be included in the actor information can be determined.

Next, the actor generation unit 105 decides whether or not the score of the new face information is higher than the lowest score among the scores of the existing pieces of face information (S256). In the case it is higher than the lowest score, the actor generation unit 105 proceeds with the process to step S257. On the other hand, in the case it is not higher than the lowest score, the actor generation unit 105 proceeds with the process to step S258. In the case the process proceeded to step S257, the actor generation unit 105 exchanges the face information with the lowest score among the existing pieces of face information and the new face information (S257), and proceeds with the process to step S258.

When the process proceeds to step S258, the actor generation unit 105 compares the score of the updated face information (hereinafter, updated face score) and the score of face information corresponding to a representative face image (hereinafter, representative face score) of the actor information, and decides whether the updated face score is higher than the representative face score or not (S258). In the case the updated face score is higher than the representative face score, the actor generation unit 105 proceeds with the process to step S259. On the other hand, in the case the updated face score is not higher than the representative face score, the actor generation unit 105 ends the processes related to updating of the actor information in step S126 in FIG. 3. In the case the process proceeded to step S259, the actor generation unit 105 updates the existing representative face image to a face image corresponding to the new face information (S259), and ends the processes related to updating of the actor information in step S126 in FIG. 3.

FIG. 3 will be referred to again. When the processes related to updating of the actor information in step S126 is complete, the information processing apparatus 100 proceeds with the process to step S127. Next, the information processing apparatus decides whether to end the face tracking or not (S127). In the case of ending the face tracking, the information processing apparatus 100 proceeds with the process to step S128. On the other hand, in the case of not ending the face tracking, the information processing apparatus 100 proceeds with the process to step S130. In the case the process proceeded to step S128, the information processing apparatus 100 selects the actor information obtained after ending the face tracking as the actor information which is to be the target of clustering (S128), and proceeds with the process to step S129.

Next, the information processing apparatus 100 performs clustering with the selected actor information as the target, by the function of the actor clustering unit 106 (S129), and proceeds with the process to step S130. Additionally, the flow of processes related to execution of actor clustering in step S129 is substantially the same as step S109 (FIG. 2) already described with reference to FIG. 7. When the process proceeds to step S130, the information processing apparatus 100 decides whether the current video frame is the final reading frame or not (S130). In the case it is the final reading frame, the information processing apparatus 100 proceeds with the process to step S141 (FIG. 4). On the other hand, in the case it is not the final reading frame, the information processing apparatus 100 proceeds with the process to step S121.

As shown in FIG. 4, the information processing apparatus 100 decides whether analysis of all the content pieces is complete or not (S141). In the case analysis of all the content pieces is complete, the information processing apparatus 100 proceeds with the process to step S142. On the other hand, in the case analysis of all the content pieces is not complete, the information processing apparatus 100 proceeds with the process to step S103 (FIG. 2). In the case the process proceeded to step S142, the information processing apparatus 100 performs final clustering processing by the function of the actor clustering unit 106 (S142).

Next, the information processing apparatus 100 updates the database of actor information (actor information DB) stored in the storage unit 102 (S143). When the actor information DB is updated, the display unit 101 displays, based on the updated actor information DB, the face information of each actor, the appearance timing of the face information, and the like. Then, the information processing apparatus 100 decides, in response to such display contents, whether there is an input from a user to correct the actor information or not (S144). In the case there is an input for correction, the information processing apparatus 100 proceeds with the process to step S143. On the other hand, in the case there is no input for correction, the information processing apparatus 100 ends the series of processes.

In the foregoing, an operation of the information processing apparatus 100 and the face clustering method according to the present embodiment have been described. However, a detailed explanation of the clustering method (first clustering scheme, second clustering scheme) according to the preliminary-final scheme was omitted. Thus, in the following, the first clustering scheme and the second clustering scheme according to the present embodiment will be described.

(1-2-1: First Clustering Scheme)

First, the first clustering scheme according to the present embodiment will be described with reference to FIGS. 16 to 20. Additionally, the clustering based on the first clustering scheme is realized by the function of the first clustering unit 1061 included in the actor clustering unit 106.

Figure 16:
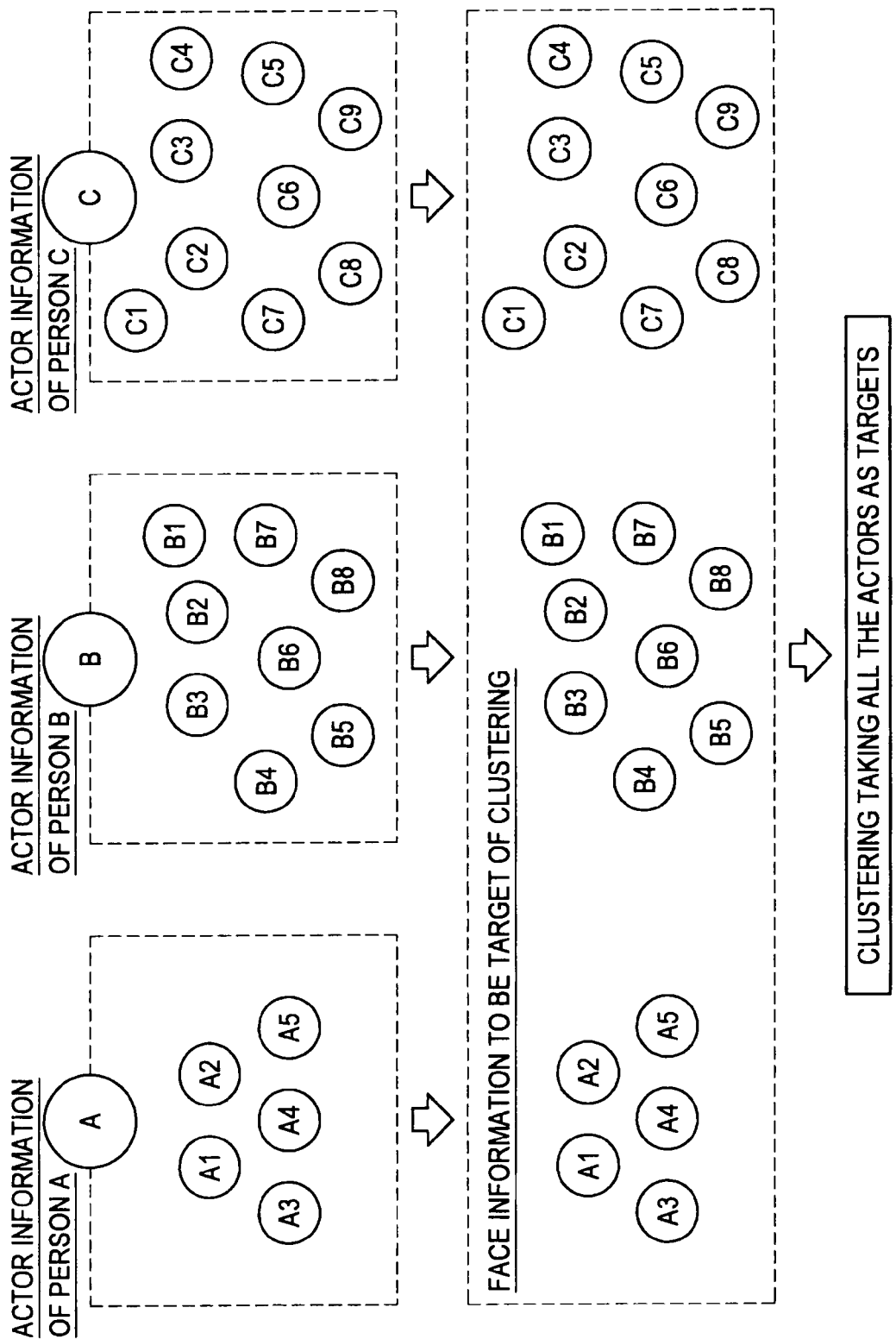
FIG. 16 is an explanatory diagram for describing the face clustering method according to the embodiment (first clustering scheme)

As shown in FIG. 16, the first clustering scheme is a scheme based on the degree of similarity of each piece of face information included in all the pieces of actor information which are the targets of clustering. Additionally, each piece of actor information that is initially given is a collection of similar pieces of face information detected by a face recognition method or a face tracking method using a determination unit described in JP-A-2010-3021, for example.

When the face tracking method is used, pieces of face information of faces, of the same person, with different directions can be included in the same actor information. However, even if pieces of face information are of the same person, the degree of similarity is low between pieces of face information of faces with greatly different directions. Accordingly, the degree of similarity between pieces of actor information each formed from face information of a face with a different direction is low even if the pieces of actor information correspond to the same person. Thus, the first clustering scheme treats separately the pieces of face information included in the actor information.

In the example of FIG. 15, actors B and C are included in the analysis section including actor A. Therefore, the actor information to be the target of clustering will be the actor information of persons A, B, and C. In this case, according to the first clustering scheme, all the pieces of face information included in the actor information of persons A, B, and C will be the target of clustering, as shown in FIG. 16. In the following, a case where the above-described actor information of persons A, B, and C are taken as the target of clustering will be concretely described. Additionally, as shown in FIG. 16, the actor information of person A includes face information A1, A2, ..., A5. Also, the actor information of person B includes face information B1, B2, ..., B8. Furthermore, the actor information of person C includes face information C1, C2, ..., C9.

When the actor information A, B, and C are given, the first clustering unit 1061 extracts the face information A1, ..., A5, B1, ..., B8, and C1, ..., C9 included in the actor information A, B, and C from each piece of the actor information. Then, the first clustering unit 1061 calculates the degree of similarity for each piece of face information, and generates clusters by aggregating pieces of face information with a high degree of similarity as shown in FIG. 17. Additionally, the degree of similarity of each piece of face information is calculated based on the Euclidean distance between feature quantity vectors characterizing respective face images, for example.

Next, the first clustering unit 1061 classifies the pieces of face information based on the directions of the faces included in the pieces of face information. An example of classifying cluster (1) is illustrated in FIG. 17. In the example of FIG. 17, face information A2, A5, B1, C7, C8, and C9 are classified as "face direction=front," and face information B3 and B6 are classified as "face direction=right." Furthermore, in this example, no face information is classified as "face direction=left."

Next, the first clustering unit 1061 generates a weighting coefficient for each face direction. This weighting coefficient indicates the degree of importance of each face direction for cluster (1). For example, this weighting coefficient is calculated based on the number of pieces of face information classified as each face direction. In the example of cluster (1), the number of pieces of face information classified as left is 0, the number of pieces of face information classified as front is 6, and the number of pieces of face information classified as right is 2. Then, the weighting coefficient corresponding to the direction with the largest number of pieces is made 1, and the weighting coefficients corresponding to other directions are determined according to the number of pieces of face information. For example, in the case of cluster (1), the weighting coefficient corresponding to front is calculated to be 1, the weighting coefficient corresponding to left is calculated to be 0, and the weighting coefficient corresponding to right is calculated to be 2/8=0.25.

Furthermore, the first clustering unit 1061 calculates the score of each piece of actor information based on the calculated weighting coefficient. This score is calculated as the sum of "the number of pieces of face information corresponding to the actor information×weighting coefficient." For example, the score corresponding to the actor information of person A is 2 from "(left) weighting coefficient 0×number of pieces 0+(front) weighting coefficient 1×number of pieces 2+(right) weighting coefficient 0.25×number of pieces 0." Similarly, the score corresponding to the actor information of person B is 1.5 from "(left) weighting coefficient 0×number of pieces 0+(front) weighting coefficient 1×number of pieces 1+(right) weighting coefficient 0.25×number of pieces 2." Furthermore, the score corresponding to the actor information of person C is 3 from "(left) weighting coefficient 0×number of pieces 0+(front) weighting coefficient 1×number of pieces 3+(right) weighting coefficient 0.25×number of pieces 0."

The score described above is used to select actor information that is to be a temporary representative. For example, in the case of cluster (1), since the score corresponding to the actor information of person A is 2, the score corresponding to the actor information of person B is 1.5, and the score corresponding to the actor information of person C is 3, the actor information of person C is selected as the temporary representative. This temporary representative indicates an estimation value of a person corresponding to the cluster (in this case, cluster (1)). That is, cluster (1) is estimated to be a collection of pieces of face information indicating the feature of person C. The first clustering unit 1061 calculates the score of actor information also for clusters (2) and (3), and selects a temporary representative for each cluster from the calculation result.

Figure 18:
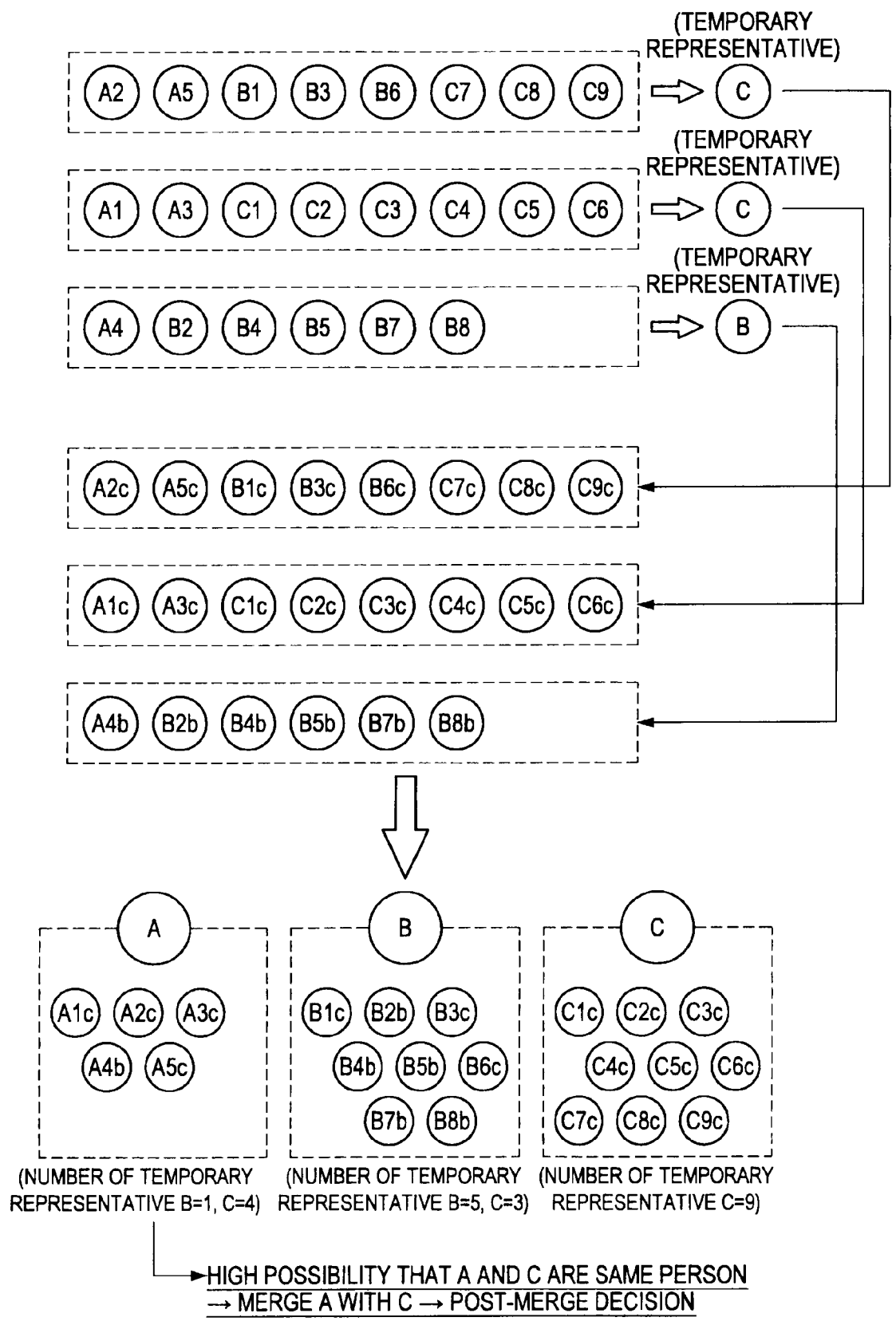
FIG. 18 is an explanatory diagram for describing the face clustering method according to the embodiment (first clustering scheme)

As shown in FIG. 18, temporary representatives C, C, and B are selected respectively for clusters (1) to (3) illustrated in FIG. 17. Thus, as shown in FIG. 18, each piece of face information forming each cluster will be shown with a label indicating the temporary representative. Specifically, face information A2 included in cluster (1) of temporary representative C is shown as face information A2c with label c indicating temporary representative C added thereto. When using this method of expression, the face information included in clusters (1) to (3) will be expressed as shown in the centre of FIG. 18. Furthermore, when the pieces of face information are re-sorted, while being expressed as they are, into the original pieces of actor information corresponding to respective persons, it will be expressed as shown in the lower part of FIG. 18.

In the example of FIG. 18, the actor information corresponding to person A includes face information A1c, A2c, A3c, A4b, and A5c. Similarly, the actor information corresponding to person B includes face information B1c, B2b, B3c, B4b, B5b, B6c, B7b, and B8b. Furthermore, the actor information corresponding to person C includes face information C1c, C2c, C3c, C4c, C5c, C6c, C7c, C8c, and C9c.

That is, one piece of face information corresponding to temporary representative B and four pieces of face information corresponding to temporary representative C are included in the actor information corresponding to person A. Also, five pieces of face information corresponding to temporary representative B and three pieces of face information corresponding to temporary representative C are included in the actor information corresponding to person B. Furthermore, nine pieces of face information corresponding to temporary representative C are included in the actor information corresponding to person C.

When extracting the type of temporary representative whose number of pieces of face information calculated for each temporary representative is the largest, it will be temporary representative C for the actor information corresponding to person A, temporary representative B for the actor information corresponding to person B, and temporary representative C for the actor information corresponding to person C. It is estimated from this result that person A and person C are highly likely to be the same person. Thus, the first clustering unit 1061 merges the actor information of person A with the actor information of person C. Then, the first clustering unit 1061 proceeds with the process of post-merge decision described later.

Additionally, the actor information of a person whose score was the highest was selected as the temporary representative in the process of selecting a temporary representative, but in the case the maximum value of the score does not exceed a predetermined threshold, the process will be carried out assuming that there is no temporary representative. Also, in the process of extracting the type of the temporary representative whose number of pieces of face information calculated for each temporary representative is the largest, if the number of pieces does not exceed a predetermined threshold, merging is not performed.

Now, the first clustering unit 1061 which has merged the pieces of actor information next performs the process of post-merge decision. The process of post-merge decision here is a process of deciding, taking into account a situation which will not occur in reality, whether the merge result is correct or not. For example, person A and person C are provisionally decided to be the same person in the example of FIG. 18, and if this result is correct, person A and person C will not appear simultaneously in the same video frame. Thus, the first clustering unit 1061 compares the appearance time of the face information forming the actor information of person A and the appearance time of the face information forming the actor information of person C, and decides whether persons A and C make appearance at the same time.

Figure 19:
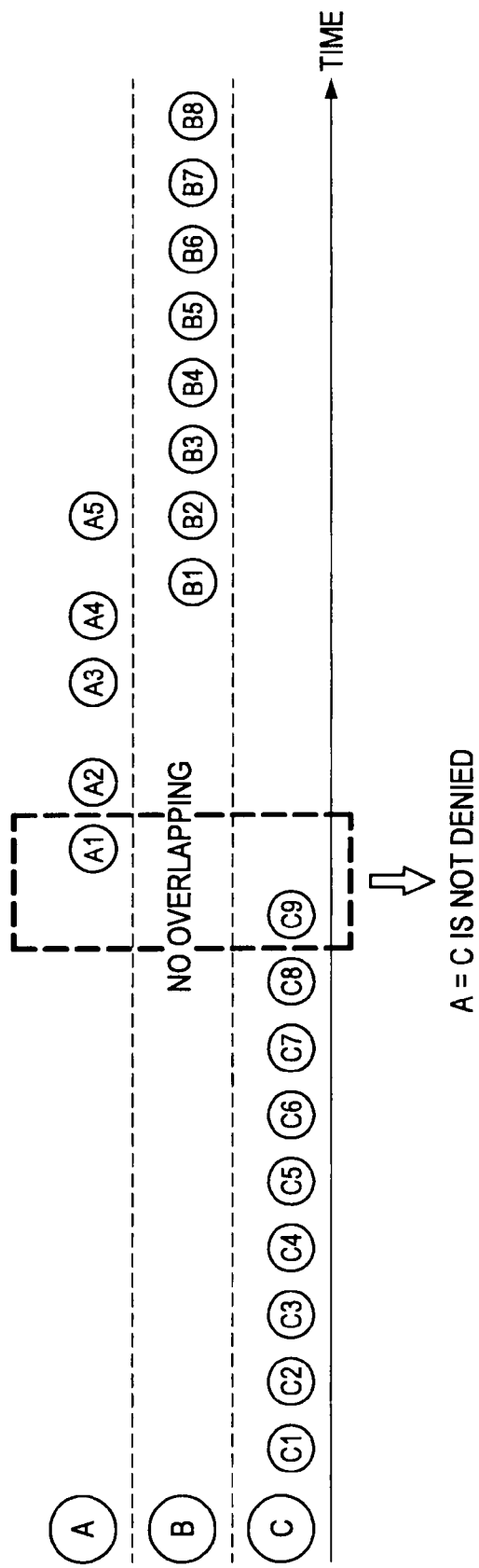
FIG. 19 is an explanatory diagram for describing the face clustering method according to the embodiment (first clustering scheme)

For example, in the example of FIG. 19, there is no overlap between the appearance times of persons A and C. Accordingly, that person A and person C are the same person is not denied. Thus, the first clustering unit 1061 merges the actor information of person A with the actor information of person C. On the other hand, in the example of FIG. 20, there is an overlap between the appearance times of persons A and C. Accordingly, it is assumed that person A and person C are not the same person. Thus, the first clustering unit 1061 does not merge the actor information of person A with the actor information of person C. Also, in the case attribute information such as sex or age of persons A and C is known in advance, the first clustering unit 1061 does not merge the actor information of person A with the actor information of person C in the case there is a discrepancy between persons A and C based on the attribute information.

As described above, erroneous decision can be prevented by performing post-merge decision, and the accuracy of clustering can be improved. Also, to further improve the accuracy of clustering, the first clustering unit 1061 again performs merging of actor information by using the merge result. For example, in the case the actor information of persons A and C are merged in the example above, the first clustering unit 1061 selects a temporary representative corresponding to the actor information after merging by the procedure described above, and decides whether merging with another actor information is to be performed or not. In the case merging is performed, the first clustering unit 1061 again selects a temporary representative corresponding to the actor information after merging, and decides whether merging with another actor information is to be performed or not. In this manner, the first clustering unit 1061 repeats the merge process for a specific number of times or until merging occurs no more. The accuracy of clustering is further improved by this repeat process.

In the foregoing, the first clustering scheme according to the present embodiment has been described.

(1-2-2: Second Clustering Scheme)

Next, the second clustering scheme according to the present embodiment will be described with reference to FIG. 21. Additionally, clustering based on the second clustering scheme is realized by the function of the second clustering unit 1062 included in the actor clustering unit 106.

Figure 21:
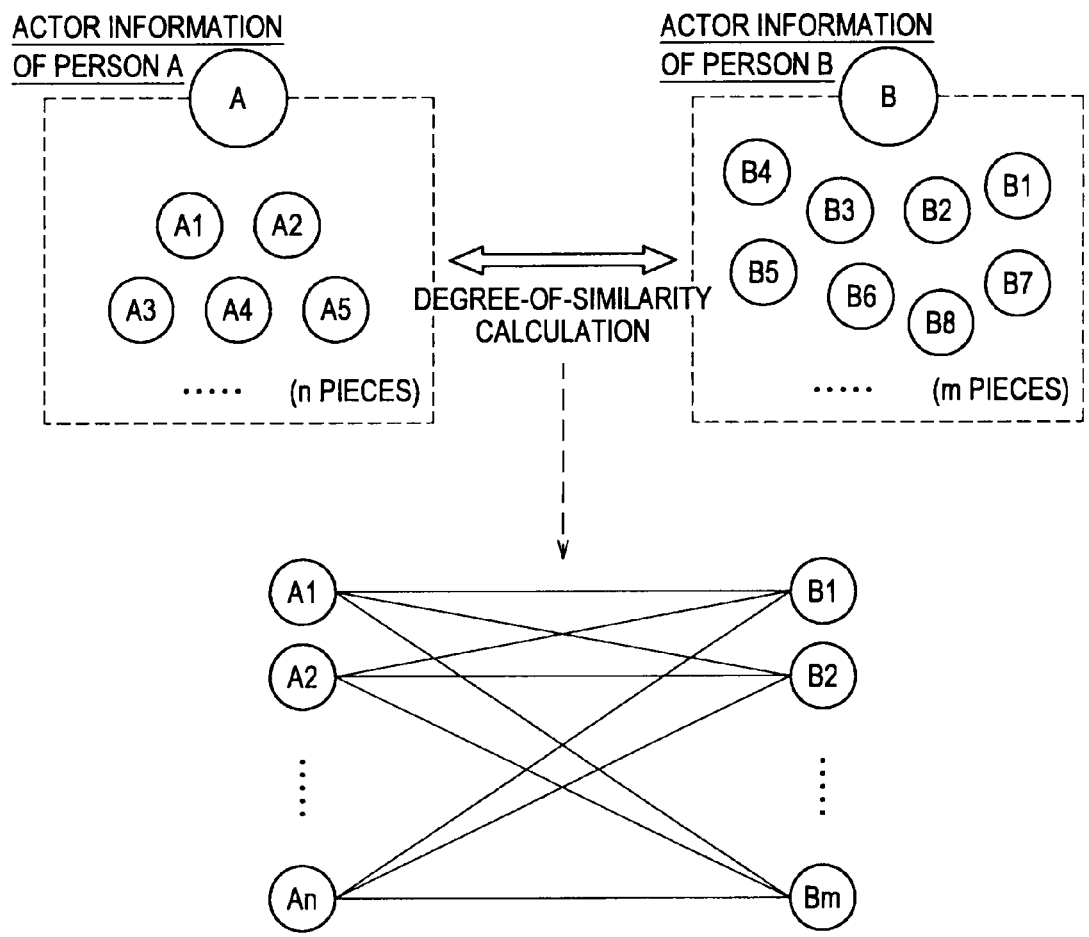
FIG. 21 is an explanatory diagram for describing the face clustering method according to the embodiment (second clustering scheme)

As shown in FIG. 21, clustering based on the second clustering scheme is performed based on the degree of similarity between pieces of actor information. That is, unlike the first clustering scheme, the second clustering scheme does not separate pieces of face information forming the actor information.

First, the second clustering unit 1062 selects pieces of actor information to be the comparison targets. In the example of FIG. 21, the actor information of person A and the actor information of person B are selected. The second clustering unit 1062 which has selected the pieces of actor information to be the comparison targets performs calculation of the degree of similarity between the pieces of face information for the selected pieces of actor information. For example, in the case n pieces of face information are included in the actor information of person A and m pieces of face information are included in the actor information of person B, the degree of similarity between pieces of face information is calculated for n×m combinations. Additionally, the degree of similarity between pieces of face information can be obtained by calculating the Euclidean distance between face feature quantities expressed by feature quantity vectors or the like.

At this time, the second clustering unit 1062 takes the directions of the faces included in the pieces of face information into account and converts the face feature quantities to the same face direction (for example, "front"), and then calculates the degree of similarity between the pieces of face information. Next, the second clustering unit 1062 weighted-averages the calculated degrees of similarity, and calculates a degree-of-similarity score corresponding to each combination of actor information. Then, the second clustering unit 1062 selects the actor information whose degree-of-similarity score exceeds a predetermined threshold as the actor information which is a merge candidate. Then, as with the first clustering scheme, the second clustering unit 1062 performs post-merge decision (see FIGS. 19 and 20) for pieces of actor information which are merge candidates.

For example, in the case there is a temporal overlap between pieces of face information forming pieces of actor information which are merge candidates or in the case the possibility of being the same person is denied based on the attribute information, the second clustering unit 1062 does not merge the pieces of actor information which are merge candidates. On the other hand, the second clustering unit 1062 merges pieces of actor information which are merge candidates and which were not denied to correspond to the same person by the post-merge decision. Furthermore, the second clustering unit 1062 selects other pieces of actor information which are to be the comparison targets, and decides whether to perform merging or not by performing calculation of the degree-of-similarity scores, threshold decision and post-merge decision in a similar manner as described above. Then, the second clustering unit 1062 decides whether to perform merging or not for all the combinations of pieces of actor information, and merges pieces of actor information that are decided to be merged.

In the foregoing, the second clustering scheme according to the present embodiment has been described.

(1-2-3: Application Step)

Here, among the processing steps of the face clustering method according to the present embodiment shown in FIGS. 2 to 11, processing steps to which the clustering processes based on the first and second clustering schemes described above are applied will be supplementarily described. Clustering based on the first and second clustering schemes described above is applied to step S109 in FIG. 2 (for details, see FIG. 7 and the like), step S129 in FIG. 3 (for details, see FIG. 7 and the like), and step S142 in FIG. 4 (for details, see FIG. 11 and the like). That is, it is applied to the clustering in each hierarchy in the preliminary-final scheme shown in FIG. 15. Which clustering scheme is to be adopted in which processing step is determined in advance in the initial setup of step S101 in FIG. 2 or a mechanism for automatic selection is provided beforehand, for example.

The example of the mechanism for automatic selection includes those described below. Additionally, the process of automatic selection is performed by the actor clustering unit 106. Furthermore, an existing scene detection technology may be adopted for decision regarding a scene described later.

(1) The first clustering scheme is adopted for merging of, where the content data is a video, pieces of actor information existing over a plurality of scenes. In a sequence over a plurality of scenes, the feature of the face changes greatly due to a large change in the shooting environment. Accordingly, the degree-of-similarity score tends to decrease even for pieces of actor information corresponding to the same person. Thus, the second clustering scheme is not appropriate for merging of pieces of actor information existing over a plurality of scenes, and the first clustering scheme is adopted as described above.

(2) The first clustering scheme is adopted in the case the content data is a video and pieces of actor information including pieces of face information in the same scene are to be merged. In the same scene, it is highly probable that the same person makes appearance in various time sections. Thus, those actually corresponding to the same person are detected as a plurality of pieces of actor information. Thus, it is more efficient to merge pieces of actor information based on the whole of pieces of face information forming a plurality of pieces of actor information. Particularly, in the case there are three or more pieces of actor information corresponding to the same person, the first clustering scheme is more appropriate than the second clustering scheme. Thus, in the case of merging pieces of actor information including pieces of face information in the same scene, the first clustering scheme is adopted as described above.

(3) The second clustering scheme is further adopted in the case the number of pieces of actor information exceeds a predetermined number after merging of pieces of actor information based on the first clustering scheme. With the clustering based on individual piece of face information, a possibility is not denied that narrowing down of pieces of actor information is not sufficiently performed. In the case narrowing down is not sufficiently performed, it is assumed that sufficient narrowing down of pieces of actor information is enabled by further adopting the second clustering scheme of performing clustering using the whole of pieces of face information forming the pieces of actor information. Thus, in the case the number of pieces of actor information exceeds a predetermined number after merging of pieces of actor information based on the first clustering scheme, the second clustering scheme is further adopted.

As described above, the first and second clustering schemes can be automatically selected as appropriate according to the feature of the scene or the state of narrowing down. Of course, which clustering scheme is to be adopted for clustering of which hierarchy may be set in advance in the initial setup.

[1-3: Performance Improvement Measure]

Here, measures for further performance improvement of the face clustering method according to the present embodiment will be described with reference to FIGS. 22 to 25.

(1-3-1: Performance Improvement Measure 1)

First, a first performance improvement measure (hereinafter, performance improvement measure 1) will be described with reference to FIG. 22. As has been described, a feature quantity slot is provided for each piece of actor information. At the time of generating the actor information, pieces of face information are assigned to the empty slots of the feature quantity slot in the order of detection time from the earliest. Furthermore, after the feature quantity slot becomes full, update of face information is performed in the order of detection time from the earliest, and the most appropriate face information is assigned to the feature quantity slot.

However, in the case pieces of face information are detected from continuous shots, neighbouring video frames or the like (hereinafter, packed section), the features of the pieces of face information will be alike. Thus, if the feature quantity slot is filled by pieces of face information detected from such packed section, the score for the feature quantity slot will be low for face information detected from a separate section, and update of face information will be obstructed. In this manner, if the feature quantity slot is occupied by pieces of face information which are detected from one section and which have a similar feature, the feature of the actor information will have only about the same degree of worth (information amount) as the feature of one piece of face information. As a result, the advantage of clustering on a per-actor-information basis will be lost.

Accordingly, as performance improvement measure 1, the functional configuration of the actor generation unit 105 is refined so as to extract pieces of face information to be assigned to the feature quantity slot from separate sections. First, the actor generation unit 105 divides the appearance section of face information, and calculates the number of pieces of face information in each appearance section. Furthermore, the actor generation unit 105 calculates the weight according to the number of pieces of face information, and selects the face information to be assigned to the feature quantity slot according to the calculated weight. According to this configuration, appropriate pieces of face information can be assigned to the feature quantity slot from widely separate sections with consideration given to the lengths of the packed sections.

(1-3-2: Performance Improvement Measure 2)

Figure 20:
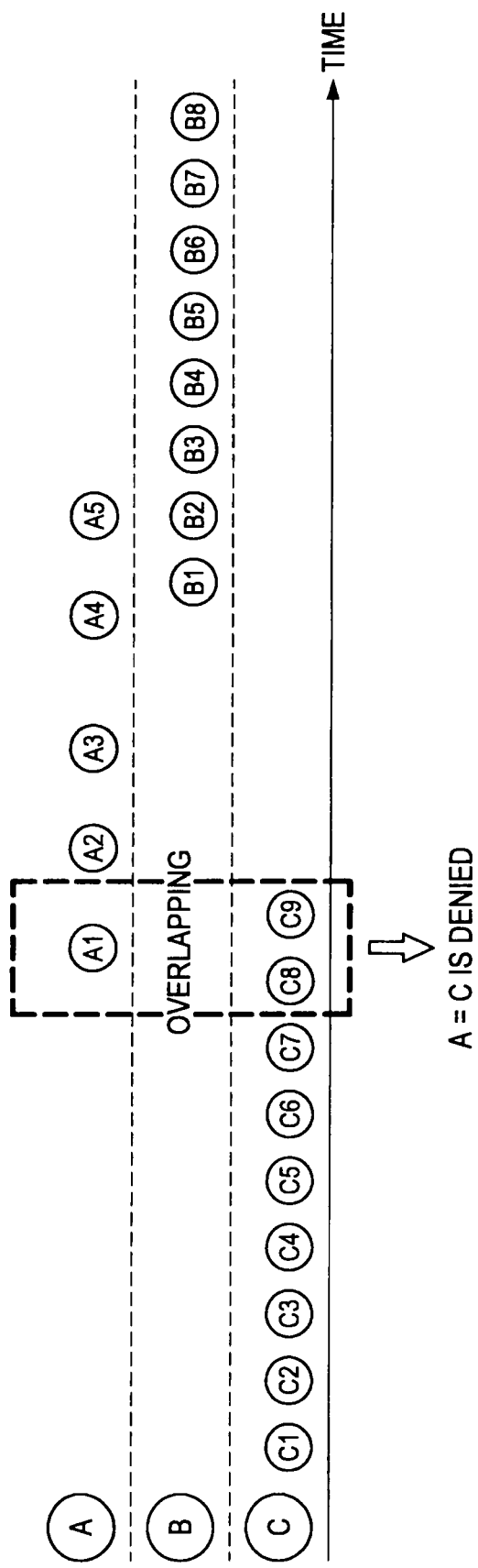
FIG. 20 is an explanatory diagram for describing the face clustering method according to the embodiment (first clustering scheme)

Next, a second performance improvement measure (hereinafter, performance improvement measure 2) will be described with reference to FIG. 23. As has been described with reference to FIGS. 19 and 20, the first clustering unit 1061 decides, as the post-merge decision, whether or not there is an overlap between appearance times of persons corresponding to pieces of actor information which are merge targets. In the case there is an overlap between the appearance times of persons as shown in FIG. 20, the first clustering unit 1061 does not perform merging.

The example of FIG. 23 shows detection times of pieces of face information in a case where a large number of pieces of face information corresponding to temporary representative B are included in the actor information of persons A and C. Additionally, the face information shown with a thick line is the face information corresponding to the temporary representative B. In this case, there is a possibility that persons A, B, and C are the same person, and the actor information of persons A, B, and C will be the merge candidates. However, in the example of FIG. 23, there is an overlap between the appearance time of person A and the appearance time of person B. Thus, it is decided by the post-merge decision that persons A and B are not the same person. Similarly, there is an overlap between the appearance time of person A and the appearance time of person C. Thus, it is decided that persons A and C are not the same person.

On the other hand, there is no overlap between the appearance time of person B and the appearance time of person C. Thus, according to the post-merge decision described with reference to FIGS. 19 and 20, the actor information of persons B and C will be merged. However, it was assumed based on the result of decision based on temporary representative that persons A, B, and C were the same person. Accordingly, based on the above results, namely person A≠person C and person A≠person B, based on the post-merge decision, it is indirectly decided to be person B≠person C. In this manner, the accuracy of clustering can be further improved by taking into account the decision result of persons' sameness based on the temporary representatives and the result of post-merge decision based on the appearance time.

(1-3-3: Performance Improvement Measure 3)

Next, a third performance improvement measure (hereinafter, performance improvement measure 3) will be described with reference to FIG. 24. There is a tendency that pieces of face information of persons who are temporally and spatially close are apt to gather. For example, there is a high possibility that face images of the same person are included in temporally close images. Also, in successive video frames, the spatial positions of face images of the same person are not greatly changed. Thus, pieces of actor information including pieces of face information of persons who are temporally and spatially close are more apt to merge with each other. However, in the case of the preliminary-final scheme described with reference to FIG. 15, pieces of actor information which are analysis targets are divided by relatively short analysis sections in the lower hierarchy. Thus, there is a possibility that the similarity of pieces of actor information near the boundary of the analysis sections is not given consideration in the lower hierarchy.

Figure 24:
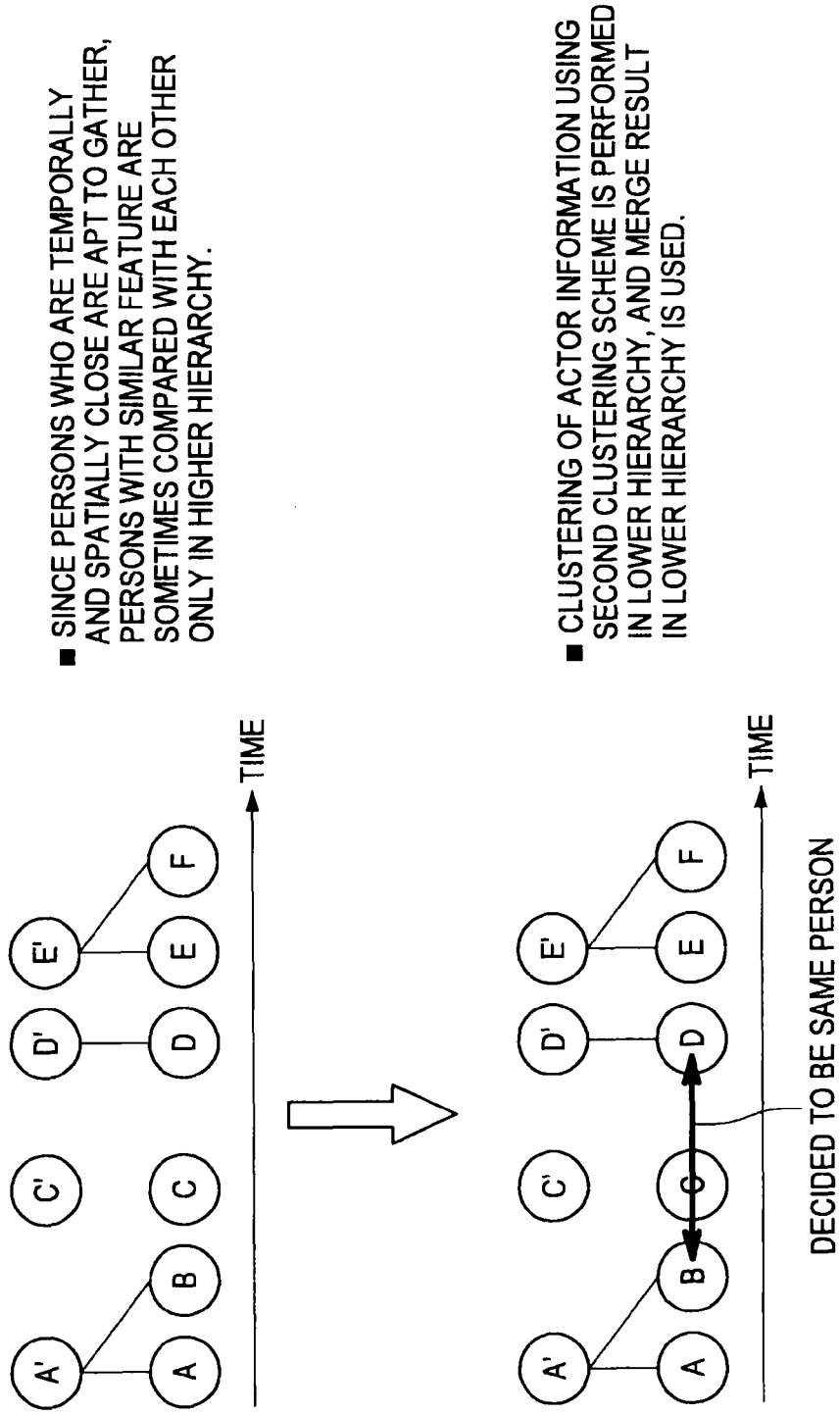
FIG. 24 is an explanatory diagram for describing the face clustering method according to the embodiment (performance improvement measure 3)

Therefore, clustering based on the second clustering scheme is performed in the lower hierarchy, and as shown in FIG. 24, and the result is reflected in the higher hierarchy. For example, in the example of FIG. 24, as a result of performing clustering based on the second clustering scheme in the lower hierarchy, it is decided that person B and person D are the same person. For example, it is assumed that, in the case clustering based on the first clustering scheme is performed in the lower hierarchy, pieces of actor information A', C', D' and E' are obtained in the higher hierarchy. In this case, since persons B and D are decided in the lower hierarchy to be the same person, actor information D' in the higher hierarchy corresponding to person D in the lower hierarchy is merged with actor information A' in the higher hierarchy corresponding to person B in the lower hierarchy. In this manner, by taking into account the similarity of pieces of actor information in the lower hierarchy, the accuracy of clustering can be further improved.

(1-3-4: Performance Improvement Measure 4)

Figure 25:
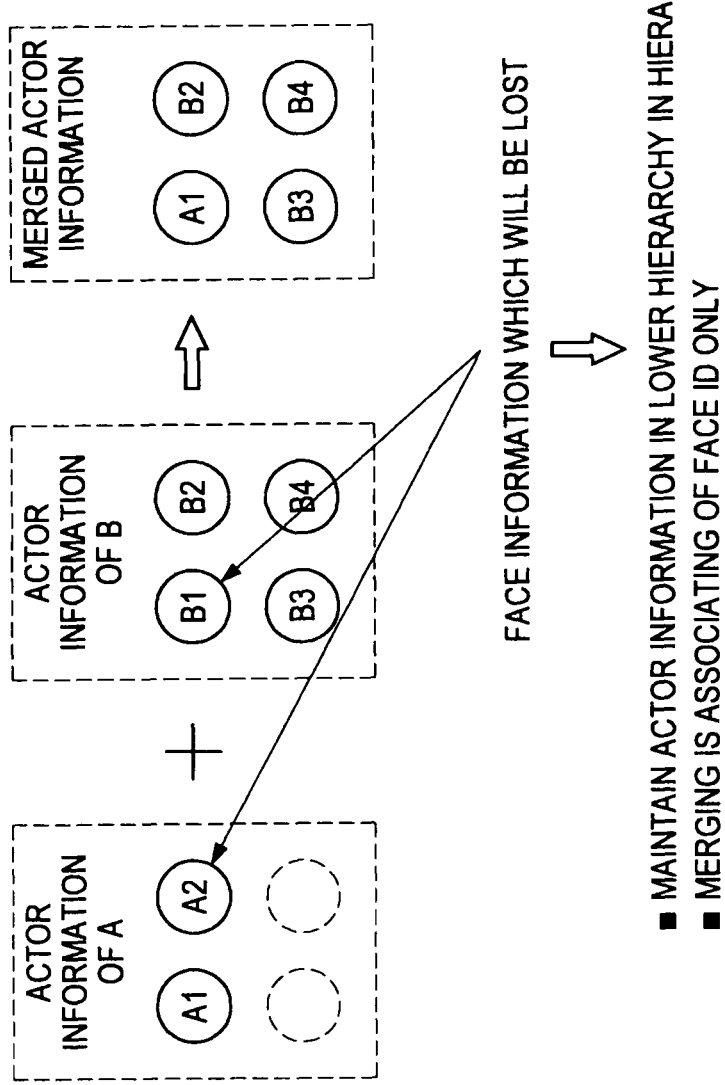
FIG. 25 is an explanatory diagram for describing the face clustering method according to the embodiment (performance improvement measure 4)

Next, a fourth performance improvement measure (hereinafter, performance improvement measure 4) will be described with reference to FIG. 25. As has been described, when two pieces of actor information are merged, a part of pieces of face information included in these pieces of actor information is lost. An example is shown in FIG. 25 of merging the actor information of person A and the actor information of person B. In this example, face information A1 and A2 are included in the actor information of person A and face information B1, B2, B3 and B4 are included in the actor information of person B. Also, face information A1, B2, B3 and B4 are included in the actor information after merging (hereinafter, merged actor information). That is, face information A2 and B1 are lost as a result of merging.

To avoid such loss of information, it is adequate to maintain the hierarchical structure and the actor information in the lower hierarchy. Also, it is adequate to manipulate, at the time of merging, the correspondence relationship, not between face information and actor information, but between a face ID and actor information. By saving the hierarchical structure and the face information, the face information in the lower hierarchy will not be lost, and additional processing using the face information in the lower hierarchy will be possible. That is, by using the face information in the lower hierarchy as appropriate, the accuracy of clustering can be improved.

In the foregoing, the performance improvement measures according to the present embodiment have been described.

[1-4: Hardware Configuration]

Figure 26:
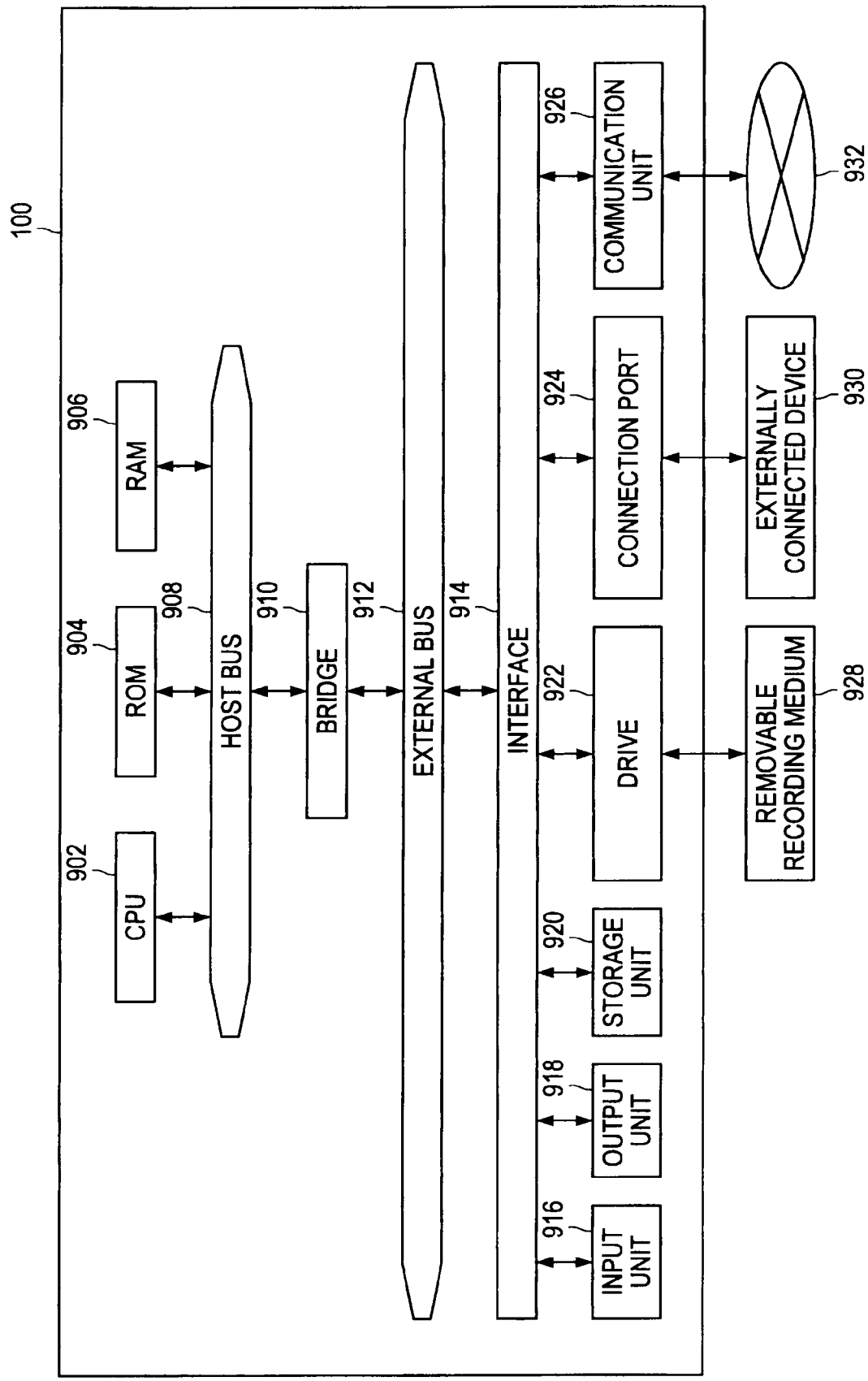
FIG. 26 is an explanatory diagram for describing an example hardware configuration of the information processing apparatus according to the embodiment.

The function of each structural element of the information processing apparatus 100 described above can be realized by using, for example, the hardware configuration of an information processing apparatus illustrated in FIG. 26. That is, the function of each structural element can be realized by controlling the hardware shown in FIG. 26 using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 26, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example.

Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

2: Summary

Lastly, the technical contents according to the embodiment of the present invention will be briefly described. The technical contents stated here can be applied to various information processing apparatuses, such as a personal computer, a mobile phone, a portable game machine, a portable information terminal, an information appliance, a car navigation system, and the like.

The functional configuration of the information processing apparatus described above can be expressed as follows. The information processing apparatus is configured from a face detection unit, a face-direction detection unit, a face identification unit, a unit group setting unit, and a clustering unit as described below. The face detection unit is for detecting a face included in an image. Also, the face-direction detection unit is for detecting a direction of the face detected by the face detection unit. Furthermore, the face identification unit is for detecting, taking into account the direction of the face detected by the face-direction detection unit, a face with a similar feature and forming a collection of pieces of face information showing a feature of this face.

Also, the unit group setting unit is for narrowing down, for each collection of pieces of face information formed by the face identification unit, the number of pieces of face information to a number set in advance for each face direction based on the direction of the face detected by the face-direction detection unit and setting each collection of pieces of face information for which the number has been narrowed down as a unit group. Furthermore, the clustering unit is for performing, with the unit group set by the unit group setting unit as a unit, clustering based on pieces of face information included in each unit group. With the pieces of face information being narrowed down by the unit group setting unit as described, face clustering can be efficiently performed with a small memory capacity even when taking, as a target, a video or the like from which a large number of pieces of face information are detected.

(Notes)

The face recognition unit 104 is an example of a face detection unit, a face-direction detection unit, and a face identification unit. The actor generation unit 105 is an example of a unit group setting unit. The actor clustering unit 106 is an example of a clustering unit. The first clustering unit 1061 is an example of a first merge unit. The second clustering unit 1062 is an example of a second merge unit. The actor information is an example of a unit group.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-90290 filed in the Japan Patent Office on Apr. 9, 2010, the entire content of which is hereby incorporated by reference.

What is claimed is:

1. A face clustering device comprising:
a face detection unit that detects a face included in an image;
a face-direction detection unit that detects a direction of the face detected by the face detection unit;
a face identification unit that identifies, taking into account the direction of the face detected by the face-direction detection unit, another face with a similar feature and forming a collection of pieces of face information showing a feature of said another face;
a unit group setting unit that narrows down, for each collection of pieces of face information formed by the face identification unit, a number of pieces of face information to a predetermined number for each face direction based on the direction of the face detected by the face-direction detection unit and sets each collection of pieces of face information for which the number has been narrowed down as a unit group; and
a clustering unit that performs, with the unit group set by the unit group setting unit as a unit, clustering based on pieces of face information included in each unit group, wherein,
when the unit group set by the unit group setting unit is expressed as a first unit group and a unit group set based on a k-th (k=1 to N) unit group is expressed as a (k+1)-th unit group, the clustering unit sequentially merges, for k=2 to N, while taking the first unit group, present in each of sections divided by a predetermined first time $T_1$ as a target, unit groups with a similar feature and sets a second unit group, and while taking the k-th unit group, present in each of sections divided by a predetermined k-th time $T_k$ ($T_k > T_{k-1}$) as a target, merges unit groups with a similar feature and sets a (k+1)-th unit group.

2. The face clustering device according to claim 1, wherein the clustering unit includes
   a first merge unit that merges, taking each piece of face information set in all the unit groups as a target, the unit groups with a similar feature based on a degree of similarity of the each piece of face information, and
   a second merge unit that merges, using a piece of face information set in each individual unit group, the unit groups with said similar feature based on a degree of similarity of the each individual unit group, and
   wherein the first merge unit performs, with an i-th (1≤i≤N) unit group as a target, a step of merging unit groups with a similar feature, and the second merge unit performs, with a j-th (j≠i) unit group as a target, a step of merging unit groups with a similar feature.

3. The face clustering device according to claim 2, wherein the clustering unit does not merge two unit groups having a substantially same time.

4. The face clustering device according to claim 2, wherein, when performing the the merge of said unit groups with said similar feature with the i-th (1≤i≤N) unit group as a target, the first merge unit repeatedly performs the merge until no other unit groups are left remaining.

5. The face clustering device according to claim 2, wherein the second merge unit performs, with at least the first unit group as a target, merging of unit groups with said similar feature.

6. The face clustering device according to claim 1, wherein the unit group setting unit narrows down the number of pieces of face information so that pieces of face information corresponding to separate times are set to a same unit group.

7. The face clustering device according to claim 1, wherein, when merging unit groups with said similar feature, the clustering unit maintains pieces of face information set in unit groups before said merging and hierarchy information showing correspondence relationships between the unit groups before said merging and a unit group after said merging.

8. A computer-implemented face clustering method comprising the steps of:
   detecting a face included in an image;
   detecting a direction of the face detected in the step of detecting a face;
   detecting, taking into account the direction of the face detected in the step of detection a direction, another face with a similar feature and forming a collection of pieces of face information showing a feature of said another face;
   narrowing down, by a processor, for each collection of pieces of face information formed in the step of detecting and forming, the number of pieces of face information to a number set in advance for each face direction based on the direction of the face detected in the step of detecting a direction, and setting each collection of pieces of face information for which the number has been narrowed down as a unit group; and
   performing, by a clustering unit, with the unit group set in the step of narrowing down and setting as a unit, clustering based on pieces of face information included in each unit group, wherein,
   when the unit group set in the step of narrowing down is expressed as a first unit group and a unit group set based on a k-th (k=1 to N) unit group is expressed as a (k+1)-th unit group, the clustering unit sequentially merges, for k=2 to N, while taking the first unit group, present in each of sections divided by a predetermined first time $T_1$ as a target, unit groups with a similar feature and sets a second unit group, and while taking the k-th unit group, present in each of sections divided by a predetermined k-th time $T_k$ ($T_k > T_{k-1}$) as a target, merges unit groups with a similar feature and sets a (k+1)-th unit group.

9. A non-transitory computer readable medium including computer readable instructions stored therein, which when executed by a processor causes the processor to implement:
   a face detection function of detecting a face included in an image;
   a face-direction detection function of detecting a direction of the face detected by the face detection function;
   a face identification function of detecting, taking into account the direction of the face detected by the face-direction detection function, another face with a similar feature and forming a collection of pieces of face information showing a feature of said another face;
   a unit group setting function of narrowing down, for each collection of pieces of face information formed by the face identification function, the number of pieces of face information to a number set in advance for each face direction based on the direction of the face detected by the face-direction detection function and setting each collection of pieces of face information for which the number has been narrowed down as a unit group; and
   a clustering function of performing, with the unit group set by the unit group setting function as a unit, clustering based on pieces of face information included in each unit group, wherein,
   when the unit group set by the unit group setting function is expressed as a first unit group and a unit group set based on a k-th (k=1 to N) unit group is expressed as a (k+1)-th unit group, the clustering function sequentially merges, for k=2 to N, while taking the first unit group, present in each of sections divided by a predetermined first time $T_1$ as a target, unit groups with a similar feature and sets a second unit group, and while taking the k-th unit group, present in each of sections divided by a predetermined k-th time $T_k$ ($T_k > T_{k-1}$) as a target, merges unit groups with a similar feature and sets a (k+1)-th unit group.

* * * * *